US010381883B2

(12) United States Patent
Harper et al.

(10) Patent No.: US 10,381,883 B2
(45) Date of Patent: *Aug. 13, 2019

(54) IDENTIFICATION USING SIGNALS FROM A SECONDARY DEVICE BEFORE WIRELESS POWER TRANSFER

(71) Applicant: Wireless Advanced Vehicle Electrification, Inc., Park City, UT (US)

(72) Inventors: Marcellus Harper, Kaysville, UT (US); Patrice Lethellier, Salt Lake City, UT (US); Hunter Wu, Sunnyvale, CA (US)

(73) Assignee: WIRELESS ADVANCED VEHICLE ELECTRIFICATION, INC., Salt Lake City, UT (US)

( * ) Notice: Subject to any disclaimer, the term of this patent is extended or adjusted under 35 U.S.C. 154(b) by 171 days.

This patent is subject to a terminal disclaimer.

(21) Appl. No.: 15/250,024

(22) Filed: Aug. 29, 2016

(65) Prior Publication Data

US 2017/0063170 A1 Mar. 2, 2017

Related U.S. Application Data

(60) Provisional application No. 62/211,540, filed on Aug. 28, 2015.

(51) Int. Cl.
*H02J 50/90* (2016.01)
*H02J 50/12* (2016.01)
(Continued)

(52) U.S. Cl.
CPC ............ *H02J 50/90* (2016.02); *B60L 53/12* (2019.02); *B60L 53/38* (2019.02); *B60L 53/65* (2019.02);
(Continued)

(58) Field of Classification Search
CPC .................... B60L 11/1846; H02J 50/90
See application file for complete search history.

(56) References Cited

U.S. PATENT DOCUMENTS 8,798,537 B2 * 8/2014 Lee .................. H02J 17/00
455/41.1
9,306,636 B2 * 4/2016 Kwon .................. H02J 50/60
(Continued)

FOREIGN PATENT DOCUMENTS

GB 2522852 A 12/2015
KR 20150059069 A * 5/2015
(Continued)

OTHER PUBLICATIONS

U.S. Appl. No. 15/250,006, filed Aug. 29, 2016, Office Action dated Feb. 21, 2018.
(Continued)

*Primary Examiner* — Pinping Sun
(74) *Attorney, Agent, or Firm* — Kunzler Bean & Adamson; Bruce R. Needham

(57) ABSTRACT

An apparatus includes a ping detection module that detects a ping signal transmitted from a secondary pad to a primary pad. The secondary pad is located on a mobile device and the primary pad located on a stationary WPT device, where the stationary WPT device transmits power through the primary pad to the secondary pad of the mobile device during a wireless power transfer operation. The ping signal includes a mobile device ID and the mobile device ID is unique to the mobile device. The apparatus includes an ID detection module that detects the mobile device ID from the ping signal received at the primary pad and a pairing module that pairs the stationary WPT device with the mobile device in response to detecting the mobile device ID of the mobile device.

11 Claims, 11 Drawing Sheets

(51) Int. Cl.

| | | |
|---|---|---|
| *H02J 50/80* | (2016.01) | |
| *H02J 7/02* | (2016.01) | |
| *H04B 1/3827* | (2015.01) | |
| *B60L 53/12* | (2019.01) | |
| *B60L 53/38* | (2019.01) | |
| *B60L 53/65* | (2019.01) | |
| *H04B 5/00* | (2006.01) | |
| *H04W 8/00* | (2009.01) | |
| *H04W 76/14* | (2018.01) | |

(52) U.S. Cl.
CPC .............. *H02J 7/025* (2013.01); *H02J 50/12* (2016.02); *H02J 50/80* (2016.02); *H04B 1/3827* (2013.01); *H04B 5/0075* (2013.01); *H04W 8/005* (2013.01); *H04W 76/14* (2018.02)

(56) References Cited

U.S. PATENT DOCUMENTS

| 9,973,038 | B2* | 5/2018 | Li | H02J 7/025 |
|---|---|---|---|---|
| 2004/0203986 | A1* | 10/2004 | Gagnon | H04B 1/0475 |
| | | | | 455/522 |
| 2011/0254503 | A1* | 10/2011 | Widmer | B60L 11/182 |
| | | | | 320/108 |
| 2012/0262002 | A1* | 10/2012 | Widmer | B60L 53/65 |
| | | | | 307/104 |
| 2013/0038272 | A1* | 2/2013 | Sagata | B60L 11/182 |
| | | | | 320/106 |
| 2013/0062959 | A1* | 3/2013 | Lee | H04B 5/0031 |
| | | | | 307/104 |
| 2013/0183898 | A1* | 7/2013 | Strid | H04B 5/0037 |
| | | | | 455/41.1 |
| 2013/0307468 | A1* | 11/2013 | Lee | H02J 7/0052 |
| | | | | 320/108 |
| 2014/0015328 | A1* | 1/2014 | Beaver | B60L 11/182 |
| | | | | 307/104 |
| 2014/0217966 | A1* | 8/2014 | Schneider | H02J 7/025 |
| | | | | 320/108 |
| 2015/0042168 | A1* | 2/2015 | Widmer | B60L 11/1829 |
| | | | | 307/104 |
| 2015/0124940 | A1* | 5/2015 | Kim | A61B 6/547 |
| | | | | 378/189 |
| 2015/0263532 | A1* | 9/2015 | Van Wageningen | H02J 5/005 |
| | | | | 307/104 |
| 2015/0310722 | A1* | 10/2015 | Sousa | H02J 50/12 |
| | | | | 307/104 |
| 2016/0233728 | A1 | 8/2016 | Park | |
| 2016/0241086 | A1 | 8/2016 | Jung | |
| 2016/0336816 | A1* | 11/2016 | MacH | H02J 50/80 |
| 2017/0030853 | A1* | 2/2017 | Hodges, Jr. | G06K 7/10366 |
| 2017/0111088 | A1* | 4/2017 | Seong | H02J 50/10 |
| 2017/0149294 | A1* | 5/2017 | Wight | H02J 50/90 |
| 2018/0028275 | A1* | 2/2018 | Bradley | A61C 8/00 |

FOREIGN PATENT DOCUMENTS

| WO | 2012058724 | 10/2012 | | |
|---|---|---|---|---|
| WO | WO-2015117989 A1 * | 8/2015 | ............ | B60L 11/182 |

OTHER PUBLICATIONS

PCT/US 2016/049329, Filed Dec. 1, 2016, International Search Report and Written Opinion dated Dec. 1, 2016.
"System Description Wireless Power Transfer", Wireless Power Consortium, Jun. 2013, pp. 1-186, vol. I, Part 1.

* cited by examiner

IDENTIFICATION USING SIGNALS FROM A SECONDARY DEVICE BEFORE WIRELESS POWER TRANSFER

CROSS-REFERENCES TO RELATED APPLICATIONS

This application claims the benefit of U.S. Provisional Patent Application No. 62/211,540 entitled "ALIGNMENT USING SIGNALS FROM A SECONDARY DEVICE BEFORE WIRELESS POWER TRANSFER" and filed on Aug. 28, 2015 for Marcellus Harper, et al., which is incorporated herein by reference.

FIELD

This invention relates to wireless power charging and more particularly relates to wireless power charging after sending a ping signal from a secondary pad of a mobile device to a pad of a stationary wireless power transfer device.

BACKGROUND

Wireless power transfer is becoming increasingly popular. Wireless power transfer involves transmitting power from a primary pad located on a stationary wireless power transfer device, such as a charging station, to a secondary pad on a mobile device, such as an electric vehicle, over a significant gap. The gap typically includes an air gap and can be significant. For example, the air gap may be from ground level to a secondary pad located under a vehicle. An air gap in the range of six inches to 10 inches is not uncommon. Prior to wireless power transfer, ensuring that the secondary pad is over the primary pad helps to provide a safe environment for wireless power transfer. Generating electromagnetic waves from the primary pad while the secondary pad is not in place over the primary pad can cause health risks, especially for people with pace makers, or other medical equipment that may be affected by the electromagnetic waves.

SUMMARY

Apparatuses for determining alignment and other purposes are disclosed. Methods also perform the functions of the apparatuses. A first apparatus includes a ping detection module that detects a ping signal transmitted from a secondary pad to a primary pad. The secondary pad is located on a mobile device and the primary pad is located on a stationary wireless power transfer ("WPT") device. The stationary WPT device transmits power through the primary pad to the secondary pad of the mobile device during a wireless power transfer operation. The apparatus includes a signal strength module that determines a signal strength of the ping signal received at the primary pad, and an alignment module that determines an amount of alignment of the secondary pad with respect to the primary pad based on the determined signal strength of the received ping signal.

In one embodiment, the alignment module includes a threshold module that determines that the secondary pad is aligned within the primary pad within a specified alignment tolerance in response to the signal strength of the received ping signal being above a ping signal threshold. In another embodiment, a plurality of ping signal thresholds are included and the threshold module determines a degree of alignment that the secondary pad is aligned within the primary pad in response to determining which of the plurality of ping signal thresholds is exceeded by the signal strength of the received ping signal. In another embodiment, the apparatus includes a wireless power module that initiates the wireless power transfer operation in response to the alignment module determining that the amount of alignment of the secondary pad with respect to the primary pad meets a specified alignment tolerance.

In one embodiment, the ping signal has a signal strength at a power level lower than a power level during a wireless power transfer operation where power is transmitted from the primary pad to the secondary pad. In another embodiment, the ping signal has a fundamental frequency different than a fundamental frequency of power transmitted from the primary pad to the secondary pad during a wireless power transfer operation. In another embodiment, the primary pad is in a fixed location and the secondary pad moves to align with the primary pad to a proposed wireless power transfer position prior to transmitting the ping signal.

In one embodiment, the ping signal includes a mobile device identifier ("ID") that is unique to the mobile device, and the apparatus includes an ID detection module that detects the mobile device ID from the ping signal received at the primary pad. In a further embodiment, the apparatus includes a pairing module that pairs the stationary WPT device with the mobile device in response to the ID detection module detecting the mobile device ID of the mobile device. In one embodiment, pairing is defined as a WPT system determining which of a plurality of primary pads and secondary pads to transfer power transfer between. In the embodiment, the mobile device is one of a plurality of mobile devices and/or the stationary WPT device is one of a plurality of stationary WPT devices. In another further embodiment, the pairing module pairs the stationary WPT device with the mobile device and/or a wireless power module that initiates the wireless power transfer operation in response to the ID detection module detecting the mobile device ID of the mobile device and the alignment module determining that the signal strength of the received ping signal is above a ping signal threshold signifying that the amount of alignment of the secondary pad with the primary pad is within a specified alignment tolerance. In another embodiment, the mobile device includes a vehicle and the stationary WPT device includes a vehicle charging station and there is an air gap between the primary pad and the secondary pad.

A second apparatus includes a ping transmit module that transmits a ping signal from a secondary pad to a primary pad. The secondary pad is located on a mobile device and the primary pad is located on a stationary WPT device. The stationary WPT device transmits power through the primary pad to the secondary pad of the mobile device during a wireless power transfer operation. The apparatus includes an alignment confirmation module that receives an alignment confirmation that the secondary pad is aligned within the primary pad within a specified alignment tolerance. The alignment confirmation is in response to determining, at the primary pad, a signal strength of the received ping signal, and determining that an amount of alignment of the secondary pad with respect to the primary pad based on the determined signal strength of the received ping signal is within the specified alignment tolerance.

In one embodiment, determining that an amount of alignment of the secondary pad with respect to the primary pad is within the specified alignment tolerance includes determining that the signal strength of the received ping signal is above a ping signal threshold. In another embodiment, the apparatus includes an ID module that generates a mobile device ID, where the ping transmit module transmits the mobile device ID along with the ping signal, the mobile device ID being unique to the mobile device. In a further embodiment, the apparatus includes a pairing module that pairs the stationary WPT device with the mobile device in response to the stationary WPT device detecting the mobile device ID of the mobile device. In the embodiment, the mobile device is one of a plurality of mobile devices and/or the stationary WPT device is one of a plurality of stationary WPT devices.

In one embodiment, the ping transmit module includes a charging circuit that utilizes at least a portion of the ping transmit module to charge and/or discharge a load capacitor in the mobile device prior to a wireless power transfer operation where power is transferred from the primary pad to the secondary pad. In a further embodiment, the mobile device includes a rectification circuit that rectifies power transferred to the secondary pad and transmits the rectified power to a load capacitor and to a mobile device load of the mobile device. The load capacitor and the mobile device load are connected in parallel. In another further embodiment, the charging circuit includes a switching circuit connected between an energy source of the mobile device and the rectifier circuit through a transfer capacitor. The switching circuit includes a plurality of switching devices arranged to operate in a switching operation to alternately charge the transfer capacitor and to deliver energy stored in the charged transfer capacitor to the rectification circuit. The rectification circuit delivers the energy to the load capacitor.

In another embodiment, the rectification circuit is a half bridge rectifier circuit or a full bridge rectifier circuit. In another embodiment, the switching circuit includes a first switch connected between the energy source and a charging midpoint and a second switch connected between a ground and the charging midpoint. The transfer capacitor connects to the charging midpoint. The first switch, the second switch, the transfer capacitor, and the rectification circuit operate as a charge pump to charge or discharge the load capacitor. In another embodiment, the apparatus includes a snubber capacitor connected between ground and a leg of the rectification circuit not connected to the transfer capacitor. During wireless power transfer, the first switch is in an open position and the second switch is in a closed position and the transfer capacitor and the snubber capacitor form at least a portion of snubber circuits.

In another embodiment, the mobile device load includes the energy storage device and the apparatus includes a third switch connected between the load capacitor and the switching circuit and/or a fourth switch connected between the mobile device load and the load capacitor. During a charge operation to charge the load capacitor the third switch is open and the fourth switch is closed and during a discharge operation to discharge the load the third switch is closed and the fourth switch is open. In another embodiment, the switching operation includes a first half cycle and a second half cycle. The first switch closes for a portion of the first half cycle according to a duty cycle while the second switch remains open during the first half cycle, and the second switch closes for a portion of the second half cycle according to the duty cycle while the first switch remains open during the second half cycle. The duty cycle varies during a load capacitor charging operation and a load capacitor discharging operation.

A third apparatus includes a ping detection module that detects a ping signal transmitted from a secondary pad to a primary pad. The secondary pad is located on a mobile device and the primary pad located on a stationary WPT device, where the stationary WPT device transmits power through the primary pad to the secondary pad of the mobile device during a wireless power transfer operation. The ping signal includes a mobile device ID and the mobile device ID is unique to the mobile device. The apparatus includes an ID detection module that detects the mobile device ID from the ping signal received at the primary pad and a pairing module that pairs the stationary WPT device with the mobile device in response to detecting the mobile device ID of the mobile device.

In one embodiment, the mobile device is one of a plurality of mobile devices and/or the stationary WPT device is one of a plurality of stationary WPT devices. In another embodiment, the apparatus includes a communication module that communicates with at least the plurality of stationary WPT devices and alerts the plurality of stationary WPT devices that the stationary WPT device that received the ping signal is paired with the mobile device that transmitted the ping signal. In another embodiment, the apparatus includes a signal strength module that determines a signal strength of the received ping signal and an alignment module that determines an amount of alignment of the secondary pad with respect to the primary pad based on the determined signal strength of the received ping signal. In a further embodiment, the pairing module pairs the stationary WPT device with the mobile device and/or a wireless power module initiates the wireless power transfer operation in response to the ID detection module detecting the mobile device ID of the mobile device and the alignment module determining that the signal strength of the received ping signal is above a ping signal threshold signifying that the amount of alignment of the secondary pad with the primary pad is within a specified alignment tolerance.

A fourth apparatus includes an ID module that generates a mobile device ID where the mobile device ID is unique to a mobile device and a ping transmit module that transmits a ping signal from a secondary pad to a primary pad where the ping signal includes the mobile device ID. The secondary pad is located on the mobile device and the primary pad is located on a stationary WPT device, where the stationary WPT device transmits power through the primary pad to the secondary pad of the mobile device during a wireless power transfer operation. The apparatus includes a pairing module that pairs the stationary WPT device receiving the ping signal with the mobile device transmitting the ping signal in response to the stationary WPT device detecting the mobile device ID of the mobile device. The mobile device is one of a plurality of mobile devices and/or the stationary WPT device is one of a plurality of stationary WPT devices.

In one embodiment, the apparatus includes an alignment confirmation module that receives an alignment confirmation that the secondary pad is aligned within the primary pad within a specified alignment tolerance. The alignment confirmation is generated and/or transmitted in response to determining, at the primary pad, a signal strength of the received ping signal, and determining that an amount of alignment of the secondary pad with respect to the primary pad based on the determined signal strength of the received ping signal is within the specified alignment tolerance. In another embodiment, the pairing module pairs the stationary WPT device with the mobile device and/or a wireless power module initiates the wireless power transfer operation in response to the stationary WPT device detecting the mobile device ID of the mobile device and the stationary WPT device determining that the signal strength of the received ping signal is above a ping signal threshold signifying that the amount of alignment of the secondary pad with the primary pad is within a specified alignment tolerance.

A first method includes detecting a ping signal transmitted from a secondary pad to a primary pad. The secondary pad is located on a mobile device and the primary pad is located on a stationary WPT device, where the stationary WPT device transmits power through the primary pad to the secondary pad of the mobile device during a wireless power transfer operation. The method includes determining a signal strength of the ping signal received at the primary pad and determining an amount of alignment of the secondary pad with respect to the primary pad based on the determined signal strength of the received ping signal.

In one embodiment, the method includes determining that the secondary pad is aligned within the primary pad within a specified alignment tolerance in response to the signal strength of the received ping signal being above a ping signal threshold. In another embodiment, the method includes initiating the wireless power transfer operation in response to determining that the amount of alignment of the secondary pad with respect to the primary pad meets a specified alignment tolerance. In another embodiment, the ping signal includes a mobile device ID where the mobile device ID is unique to the mobile device, and the method includes detecting the mobile device ID from the ping signal received at the primary pad and pairing the stationary WPT device with the mobile device in response to detecting the mobile device ID of the mobile device. The mobile device is one of a plurality of mobile devices and/or the stationary WPT device comprises one of a plurality of stationary WPT devices. In another embodiment, pairing the stationary WPT device with the mobile device and/or initiating the wireless power transfer operation occur in response to detecting the mobile device ID of the mobile device and determining that the signal strength of the received ping signal is above a ping signal threshold signifying that the amount of alignment of the secondary pad with the primary pad is within a specified alignment tolerance.

A second method includes transmitting a ping signal from a secondary pad to a primary pad. The secondary pad is located on a mobile device and the primary pad is located on a stationary WPT device, where the stationary WPT device transmits power through the primary pad to the secondary pad of the mobile device during a wireless power transfer operation. The method includes receiving an alignment confirmation that the secondary pad is aligned within the primary pad within a specified alignment tolerance, the alignment confirmation in response to determining, at the primary pad, a signal strength of the received ping signal, and determining that an amount of alignment of the secondary pad with respect to the primary pad based on the determined signal strength of the received ping signal is within the specified alignment tolerance.

In one embodiment, the method includes generating a mobile device ID, where the mobile device ID is transmitted along with the ping signal and the mobile device ID is unique to the mobile device, pairing the stationary WPT device with the mobile device in response to the stationary WPT device detecting the mobile device ID of the mobile device. The mobile device is one of a plurality of mobile devices and/or the stationary WPT device is one of a plurality of stationary WPT devices.

A third method includes detecting a ping signal transmitted from a secondary pad to a primary pad. The secondary pad is located on a mobile device and the primary pad is located on a stationary WPT device, where the stationary WPT device transmits power through the primary pad to the secondary pad of the mobile device during a wireless power transfer operation. The ping signal includes a mobile device ID and the mobile device ID is unique to the mobile device. The method includes detecting the mobile device ID from the ping signal received at the primary pad and pairing the stationary WPT device with the mobile device in response to detecting the mobile device ID of the mobile device.

In one embodiment, the mobile device is one of a plurality of mobile devices and/or the stationary WPT device is one of a plurality of stationary WPT devices and the method includes communicating with at least the plurality of stationary WPT devices and alerting the plurality of stationary WPT devices that the stationary WPT device that received the ping signal is paired with the mobile device that transmitted the ping signal. In another embodiment, the method includes determining a signal strength of the received ping signal and determining an amount of alignment of the secondary pad with respect to the primary pad based on the determined signal strength of the received ping signal. In another embodiment, pairing the stationary WPT device with the mobile device and/or initiating the wireless power transfer operation occur in response to detecting the mobile device ID of the mobile device and determining that the signal strength of the received ping signal is above a ping signal threshold signifying that the amount of alignment of the secondary pad with the primary pad is within a specified alignment tolerance.

A fourth method includes generating a mobile device ID, where the mobile device ID is unique to a mobile device, and transmitting a ping signal from a secondary pad to a primary pad. The secondary pad is located on the mobile device and the primary pad is located on a stationary WPT device, where the stationary WPT device transmits power through the primary pad to the secondary pad of the mobile device during a wireless power transfer operation, the ping signal comprising the mobile device ID. The method includes pairing the stationary WPT device with the mobile device in response to the stationary WPT device detecting the mobile device ID of the mobile device. The mobile device is one of a plurality of mobile devices and/or the stationary WPT device is one of a plurality of stationary WPT devices.

In one embodiment, the method includes receiving an alignment confirmation that the secondary pad is aligned within the primary pad within a specified alignment tolerance. The alignment confirmation is generated and/or transmitted in response to determining, at the primary pad, a signal strength of the received ping signal, and determining that an amount of alignment of the secondary pad with respect to the primary pad based on the determined signal strength of the received ping signal is within the specified alignment tolerance. In another embodiment, pairing the stationary WPT device with the mobile device and/or initiating a wireless power transfer operation of power from the primary pad to the secondary pad occur in response to detecting the mobile device ID of the mobile device and determining that the signal strength of the received ping signal is above a ping signal threshold signifying that the amount of alignment of the secondary pad with the primary pad is within a specified alignment tolerance.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
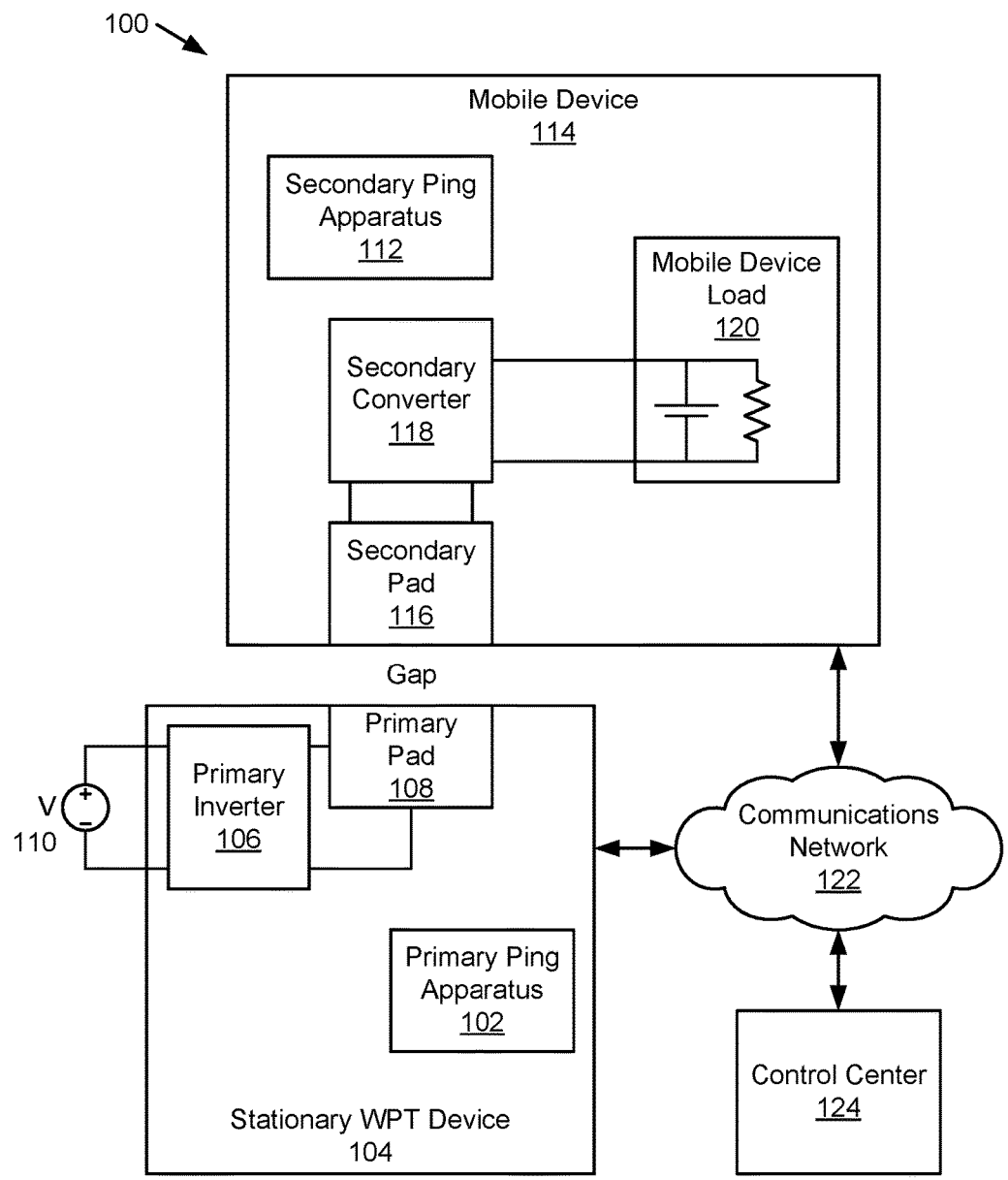
FIG. 1 is a schematic block diagram illustrating one embodiment of a wireless power transfer ("WPT") system in accordance with one embodiment of the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

FIG. 1 is a schematic block diagram illustrating one embodiment of a wireless power transfer ("WPT") system 100 in accordance with one embodiment of the present invention. The system 100 includes a primary ping apparatus 102 in a stationary WPT device 104 with a primary inverter 106 and a primary pad 108, a power source 110, a secondary ping apparatus 112 in a mobile device 114 with a secondary pad 116, a secondary converter 118, and a mobile device load 120, a communications network 122 and a control center 124, which are described below.

The system 100, in one embodiment, includes a stationary WPT device 104 that includes a primary ping apparatus 102. The primary ping apparatus 102 receives a ping signal from a mobile device 114 and will be explained in more detail with respect to the apparatuses 200, 300, 400 of FIGS. 2-4. The stationary WPT device 104, in one embodiment, is connected to a power source 110, such as a power utility, a generator, a battery or other source of electrical energy. The stationary WPT device 104 provides power to the mobile device 114 using a wireless power transfer technique. Power from the power source 110 is conditioned by the primary inverter 106 and is transmitted to the primary pad 108, which transfers power wirelessly to the secondary pad 116 of the mobile device 114. The stationary WPT device 104, in one embodiment, is ground mounted with the primary pad 108 flush with a roadway, a parking surface, a building floor, or other location. In another embodiment, the stationary WPT device 104 is located overhead and the mobile device 114 may move under the stationary WPT device 104 for wireless energy transfer.

In another embodiment, the stationary WPT device 104 is a device that may be plugged in and may be moved, but is intended primarily to be placed in a location while the mobile device 114 is intended to move after the wireless power transfer. For example, the mobile device 114 may include a mobile device load 120 with an energy storage device, such as a battery or other energy storage device and the stationary WPT device 104 may engage in a charging operation. In addition, the mobile device load 120 may include one or more additional loads, represented in FIG. 1 as a resistor, that are not energy storage devices, but that consume power transferred from the stationary WPT device 104 as power is wirelessly transferred to the mobile device 114. One of skill in the art will recognize other types of stationary WPT devices 104.

The mobile device 114, in one embodiment, is a device intended to be moved or to move itself using power from the stationary WPT device 104. For example, the mobile device 114 may be a vehicle that receives power from the stationary WPT device 104 and the stationary WPT device 104 is located where the mobile device 114 can drive over or under the primary pad 108. In another embodiment, the mobile device 114 is a consumer electronics device, such as a mobile phone, a music player, a tablet computer, and the like.

Typically, wireless power transfer requires a particular degree of alignment between the primary pad 108 and the secondary pad 116 for wireless power transfer to occur. While some wireless power transfer may occur for a low amount of alignment, typically it is desirable to have a particular amount of alignment and to meet a specified alignment tolerance prior to initiating wireless power transfer to increase efficiency. While alignment may be determined using sensors or other devices in addition to what is depicted in FIG. 1, a convenient way of determining alignment includes determining an amount of coupling between the primary pad 108 and the secondary pad 116. For example, a coupling coefficient associated with the primary pad 108 and the secondary pad 116 correlates to alignment of the primary pad 108 and the secondary pad 116. Transmitting a signal from the primary pad 108 to the secondary pad 116 may allow measurement of the signal at the secondary pad 116 to determine the coupling coefficient to determine an amount of alignment.

Transmitting a signal from the primary pad 108 may be convenient because circuitry in the stationary WPT device 104 is already capable of transmission and the mobile device 114 may be set up only to receive power. However, it may be undesirable for the stationary WPT device 104 to transmit a signal for alignment purposes due to safety concerns. For example, a device, a person, an animal, etc. may be located in close proximity to the primary and exposure to the electromagnetic waveforms emanating from the primary pad 108 may exceed safety standards. The WPT system 100 depicted in FIG. 1 offers a solution to the problems associated with transmission of a signal from the primary pad 108. The WPT system 100 is capable of sending a signal, described herein as a "ping signal," from the secondary pad 116 to the primary pad 108 for alignment and identification purposes.

The stationary WPT device 104, in one embodiment, includes a primary inverter 106 that converts power from the power source 110 to a state convenient for wireless power transfer. Waveforms from the stationary WPT device 104 typically include alternating current ("AC") waveforms that are typically sinusoidal or include a fundamental sinusoidal waveform at a particular frequency and harmonic sinusoidal waveforms of the fundamental waveform. Typically, harmonics of the fundamental waveform are undesirable and are minimized as much as practical.

The primary inverter 106, in one embodiment, is a resonant inverter. Resonant inverters have been shown to be an efficient way to provide wireless power transfer. Other wireless power transfer techniques may also be used, including a typical inverter that generates a square waveform, which may or may not be further filtered to reduce harmonics. Where a resonant inverter is used, the resonant inverter may be of any number of resonant inverter (also called a resonant converter) topologies, such as a series resonant inverter, a parallel resonant inverter, a series parallel resonant converter, an inductor-capacitor-inductor ("LCL") load resonant inverter, and the like. In one embodiment, the primary inverter 106 includes one or more LCL load resonant inverter stages coupled to the primary pad 108, which is typically configured as an inductance. Design of an LCL load resonant inverter system and other design considerations is discussed in more detail in U.S. patent application Ser. No. 13/748,269, filed Jan. 23, 2013, for Hunter Wu, et al., titled "WIRELESS POWER TRANSFER SYSTEM" [hereinafter "the '269 application"], and is incorporated herein by reference for all purposes.

The primary pad 108 of the stationary WPT device 104 is typically configured as an inductive device shaped to direct an electromagnetic field across a gap to the secondary pad 116 to electromagnetically couple with the secondary pad 116 with a degree of coupling that may be at least partially embodied using a coupling coefficient. Typically, the secondary pad 116 is also configured as an inductive device with a design to efficiently couple with the primary pad 108. Often primary and secondary pads are designed with coils that are planar or semi-planar. Design considerations for primary and secondary pads are also discussed in more detail in the '269 application.

As stated above, using a signal transmitted from one pad to another pad to determine alignment is convenient. Various signals and methods may be used in conjunction with using the primary pad 108 and the secondary pad 116 to determine alignment. For example, the signal may be varied over a conduction angle range, may be transmitted at a particular signal strength, etc. and the signal may then be detected at the receiving pad. Various methods of using the primary and secondary pads of a WPT system for determining alignment are discussed in more detail in U.S. patent application Ser. No. 14/559,817, filed Dec. 3, 2014, for Hunter Wu, et al., titled "DETERMINING PHYSICAL ALIGNMENT BETWEEN MAGNETIC COUPLERS FOR WIRELESS POWER TRANSFER" [hereinafter "the '817 application"], and is incorporated herein by reference for all purposes.

In one embodiment, mobile device 114 includes a secondary ping apparatus 112 that initiates a ping signal transmitted through the secondary pad 116 to the primary pad 108. In one embodiment, the secondary ping apparatus 112 uses elements of the mobile device 114, such as an energy source in the mobile device load 120, such as the battery depicted in the mobile device load 120, and the secondary converter, to generate and send the ping signal through the secondary pad 116 to the primary pad 108. The secondary ping apparatus 112 is discussed in more detail with respect to the apparatuses 500, 600, 700, 800, 900 and 1000 of FIGS. 5-10.

The mobile device 114, in one embodiment, includes a secondary converter 118 that typically converts AC waveforms received at the secondary pad 116 to direct current ("DC") power to be used to charge a battery or other load of the mobile device load 120. In another embodiment, the mobile device 114 includes other conditioning equipment that converts energy from the secondary pad 116 to an AC waveform for use by the mobile device 114 or for battery charging. For example, the mobile device 114 may include equipment that converts power from the secondary pad 116 to a 60 hertz ("Hz") AC waveform to be used by the mobile device 114. The mobile device 114 may then use the 60 Hz AC waveform for standard AC equipment and/or battery charging. In one embodiment, the secondary converter 118 includes a rectification circuit and a DC-to-DC converter to convert rectified DC power to another voltage. For example, the '269 application includes more detail with regard to a topology that uses a rectification circuit and a DC-to-DC converter.

In one example, the secondary converter 118 is designed to be bidirectional. For example, diodes in a typical secondary converter topology may be replaced with switching devices. In another embodiment, the mobile device 114 includes as unidirectional secondary converter 118 and the secondary ping apparatus 112 includes additional circuitry to generate the ping signal. In one embodiment, the secondary converter 118 includes resonant elements, such as one or more additional inductors that are in addition to the secondary pad 116, and/or one or more additional capacitors. The rectification circuit, in one embodiment, is a full bridge rectifier. In another embodiment, the rectification circuit is a half bridge rectifier. In another embodiment, the rectification circuit includes an active rectification circuit that includes one or more switching devices.

In one embodiment, the WPT system 100 includes a communications network 122 that may communicate between one or more stationary WPT devices 104, one or more mobile devices 114, and a control center 124. For example, the communications network 122 may communicate with the stationary WPT devices 104 via a computer network, via a radio network, and the like. The communications network 122 may communicate with one or more mobile device 114 over a radio network, a cellular network, and the like. The control center 124 may communicate with the stationary WPT devices 104 and mobile devices 114 and vice versa. In another embodiment, the WPT system 100 does not include a control center 124.

In one embodiment, the communications network 122 may facilitate communication between a stationary WPT device 104 and a mobile device 114 using a local communication protocol that is specific to the stationary WPT device 104 and the mobile device 114. The local communication protocol may be secure and may exclude interference from or transmission to another device. For example, the communication network 122 between the stationary WPT device 104 and the mobile device 114 may be used for controlling wireless power transfer and may have a bandwidth of an appropriate speed for controlling the wireless power transfer.

Figure 2:
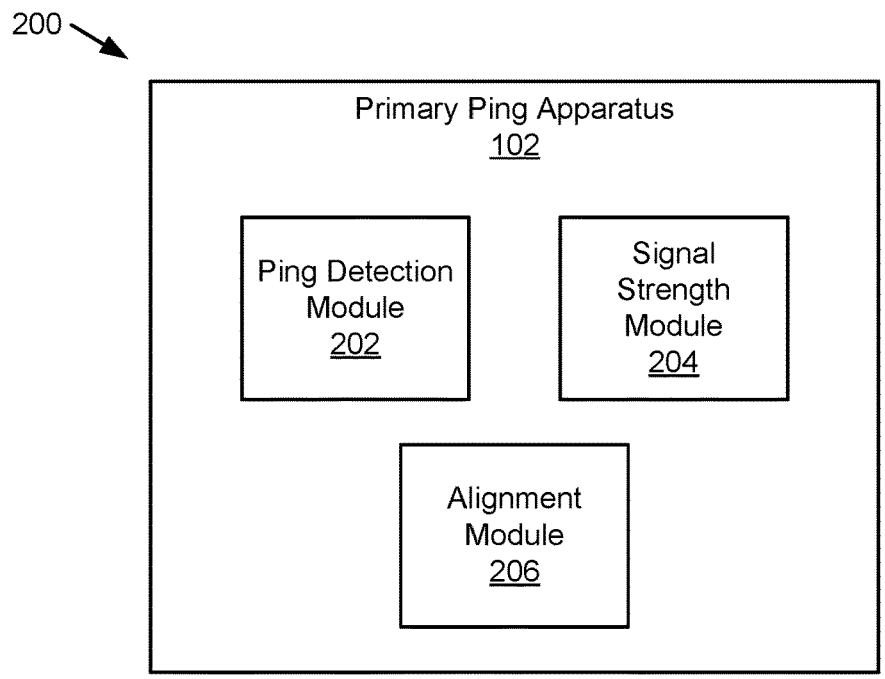
FIG. 2 is a schematic block diagram illustrating one embodiment of a primary ping apparatus in accordance with one embodiment of the present invention.

FIG. 2 is a schematic block diagram illustrating one embodiment of a primary ping apparatus 200 in accordance with one embodiment of the present invention. The apparatus 200 includes, in one embodiment, a ping detection module 202, a signal strength module 204, and an alignment module 206, which are described below. While the ping detection module 202, the signal strength module 204, and the alignment module 206 are depicted in the primary ping apparatus 102, all or a portion of the modules 202-206 may be located within various components of the stationary WPT device 104.

In one embodiment, the apparatus 200 includes a ping detection module 202 that detects a ping signal transmitted from the secondary pad 116 to the primary pad 108. The secondary pad 116 located on the mobile device 114 and the primary pad 108 located on the stationary WPT device 104. The stationary WPT device 104 transmits power through the primary pad 108 to the secondary pad 116 of the mobile device 114 during a wireless power transfer operation. In one embodiment, the ping signal includes an AC component. For example, the ping signal may include a fundamental frequency and one or more harmonic frequencies. Typically, the harmonic frequencies are less desirable and may be filtered out to some extent. In other embodiments, the ping signal is a square wave or a similar waveform with harmonics.

In one embodiment, the ping signal includes a fundamental frequency that is different than a fundamental frequency of power being transferred from the primary pad 108 to the secondary pad 116 during a wireless power operation. For example, the fundamental frequency of the ping signal may be higher than the fundamental frequency during wireless power transfer. Having a ping signal at a different frequency than the fundamental frequency during wireless power transfer may help to distinguish the ping signal from wireless power transfer. For example, if the fundamental frequency during wireless power transfer is 20 kilohertz ("kHz"), the fundamental frequency of the ping signal may be 40 kHz. Having a different frequency may be useful in situations where there are multiple stationary WPT devices 104 and multiple mobile devices 114 where there may be some crosstalk, where there is a common source, common ground, or other situations where wireless power transfer on one stationary WPT device 104 and paired mobile device 114 may affect another stationary WPT device 104 and paired mobile device 114. In another embodiment, the ping signal and the fundamental frequency during wireless power transfer are the same.

In one embodiment, the ping signal has a signal strength at a power level lower than a power level during a wireless power transfer operation where power is transmitted from the primary pad 108 to the secondary pad 116. For example, the amplitude of the ping signal may be lower than the amplitude of waveforms during wireless power transfer. In another embodiment, the signal strength of the ping signal transmitted from the secondary pad 116 may be below a safety limit. In one embodiment, the signal strength of the ping signal is above a noise level caused by stray signals, adjacent wireless power transfer, and the like. For example, the signal strength of the ping signal may be selected to be a safety margin above ambient noise, such as ten times an ambient noise level, so that the ping signal may be detected, but not at a higher level to avoid safety issues and wasted energy.

In another embodiment, the ping signal is transmitted for a period of time that is long enough to be detected at the primary pad 108. For example, detection may take 10 milliseconds ("mS") due to component processing times, etc. and the ping signal may last 50 mS so that the ping signal may be detected at the primary pad 108. In other embodiments, the ping signal may be transmitted long enough to transmit information encoded in the ping signal. For example, the ping signal may be a carrier for embedded information. In another embodiment, the ping signal may be turned on and off in a digital pattern and the ping signal may last long enough to transmit the digital pattern at least once, but possibly multiple times. In another embodiment, the ping signal is transmitted until the primary ping apparatus 102 transmits an acknowledgement. One of skill in the art will recognize other ways to generate a ping signal that may be received at the primary pad 108.

In one embodiment, the ping detection module 202 detects the ping signal by monitoring the primary pad 108. For example, the ping detection module 202 may be separate from the primary inverter 106. In the example, the ping detection module 202 may connect to the primary pad 108 in a way to not interfere with the primary inverter 106. For example, the ping detection module 202 may include an isolation transformer or other isolation circuitry that allows the ping detection module 202 to operate without interference with the primary inverter 106. In another embodiment, the ping detection module 202 is integrated with the primary inverter 106.

In one embodiment, the ping detection module 202 includes one or more filters. For example, a comb filter and or a notch filter may be used to filter out unwanted frequencies that may be present and a band pass filter and/or a parametric filter may be used separately or together to detect a particular frequency or frequencies of the ping signal. For example, a band pass filter and/or parametric filter may be used to detect a fundamental frequency of the ping signal. Other filters may be used to isolate other frequencies, for example, a frequency that includes a mobile device identifier ("ID") signal. One of skill in the art will recognize other ways to use filters to improve accuracy of the ping detection module 202 while detecting a ping signal.

In one embodiment, the apparatus 200 includes a signal strength module 204 that determines a signal strength of the ping signal received at the primary pad 108. For example, the ping detection module 202 and/or the signal strength module 204 may generate a waveform scale to a desired value and the signal strength module 204 may then detect the signal strength of the detected ping signal. In another embodiment, the apparatus 200 includes an alignment module 206 that determines an amount of alignment of the secondary pad 116 with respect to the primary pad 108 based on the determined signal strength of the received ping signal. For example, signal strength of the ping signal may be related to alignment. The relationship between alignment and signal strength of the ping signal may be known and may be linear or non-linear. The alignment module 206 may correlate signal strength with alignment so that for a particular signal strength an amount of alignment may be known.

Alignment between the primary pad 108 and the secondary pad 116 may include a distance between the primary pad 108 and the secondary pad 116 as well as alignment in a direction perpendicular to a line through the center point of the primary pad 108 and perpendicular to the primary pad 108. For example, where the primary pad 108 is mounted parallel or flush with the ground, floor or other horizontal surface at a particular location, alignment may be determined in terms of a horizontal offset of the secondary pad 116. In one embodiment for vehicle charging, the mobile device 114 may be a vehicle and the secondary pad 116 may be mounted to the vehicle. The stationary WPT device 104 may be ground mounted so that the primary pad 108 is in the ground and flush with the ground or otherwise parallel to the ground above or below a ground level a certain distance. In the embodiment, the secondary pad 116 may be a fixed height above the ground, such as in a range of 6-18 inches while the vehicle may pull over the primary pad 108 in an attempt to align with the primary pad 108.

Perfectly aligned, in one embodiment, may include having a center point of the secondary pad 116 directly over a center point of the primary pad 108 and deviation from this perfect alignment may result in decreased wireless power transfer efficiency. Alignment, in one embodiment, may be required to meet a specified alignment tolerance where a degree of alignment below the specified alignment tolerance may result in delay of a wireless power transfer operation until the degree of alignment is within the specified alignment tolerance.

Figure 3:
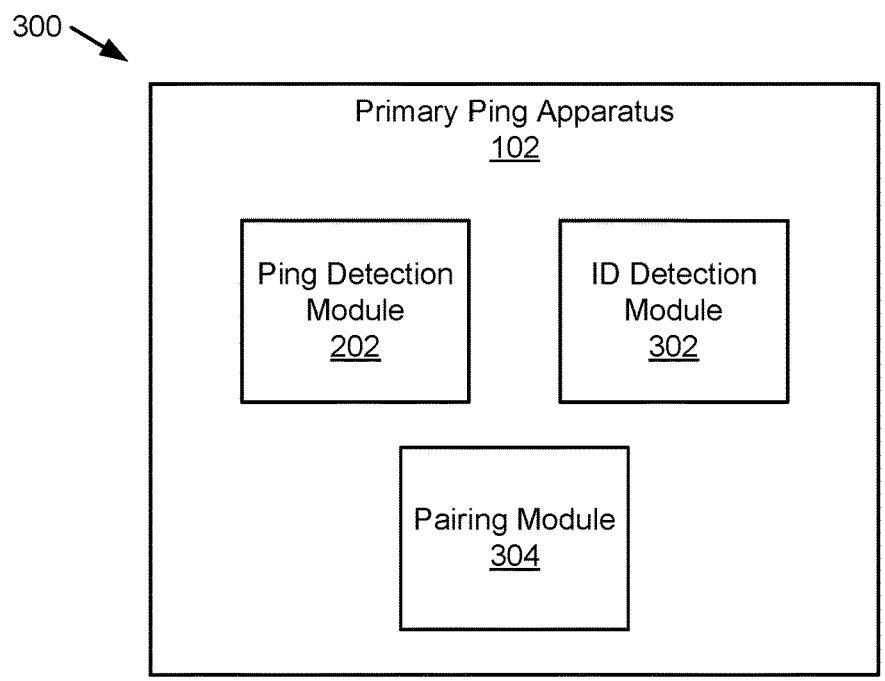
FIG. 3 is a schematic block diagram illustrating an alternate embodiment of a primary ping apparatus in accordance with one embodiment of the present invention.

FIG. 3 is a schematic block diagram illustrating an alternate embodiment of a primary ping apparatus 300 in accordance with one embodiment of the present invention. The apparatus 300, in one embodiment, includes a ping detection module 202 that is substantially similar to the ping detection module 202 described above in relation to the apparatus 200 of FIG. 2. The apparatus 300 also includes an ID detection module 302 and a pairing module 304, which are described below.

In one embodiment, the ping signal includes a mobile device ID, where the mobile device ID is unique to the mobile device 114, and the apparatus 300 includes an ID detection module 302 that detects the mobile device ID from the ping signal received at the primary pad 108. In one embodiment, the mobile device ID is encoded in the ping signal digitally where the ping signal varies between a high and a low value at a particular timing interval where the high and low values represent ones and zeros. In another embodiment, the ping signal is a carrier waveform and the mobile device ID is transmitted at a higher frequency than the ping signal and the mobile device ID is filtered from the ping signal. One of skill in the art will recognize other ways to transmit the mobile device ID with the ping signal.

Where there are multiple mobile devices 114, each mobile device 114 may transmit a different mobile device ID, which may help to keep track of where a mobile device 114 is located. In addition, where there are multiple stationary WPT devices 104, detecting a mobile device ID at a particular multiple stationary WPT device 104 provides a location of the mobile device 114, for example to the control center 124.

In one embodiment, the apparatus 300 includes a pairing module 304 that pairs the stationary WPT device 104 with the mobile device 114 in response to the ID detection module 302 detecting the mobile device ID of the mobile device 114. In one embodiment, pairing is defined as the WPT system 100 determining which of a plurality of primary pads 108 and secondary pads 116 to transfer power transfer between. Where the system 100 includes multiple stationary WPT devices 104 and/or multiple mobile devices 114, pairing of a stationary WPT device 104 with a mobile device 114 may remove the stationary WPT device 104 and the mobile device 114 from a pool of stationary WPT devices 104 and/or mobile devices 114 and may free up communication bandwidth for other communications. Other systems may require a broadcast of a pairing of a mobile device 114 where use of the pairing module 304 may allow the paired stationary WPT device 104 to transmit the pairing information to the control center 124, which may then share this information with other stationary WPT devices 104.

Figure 4:
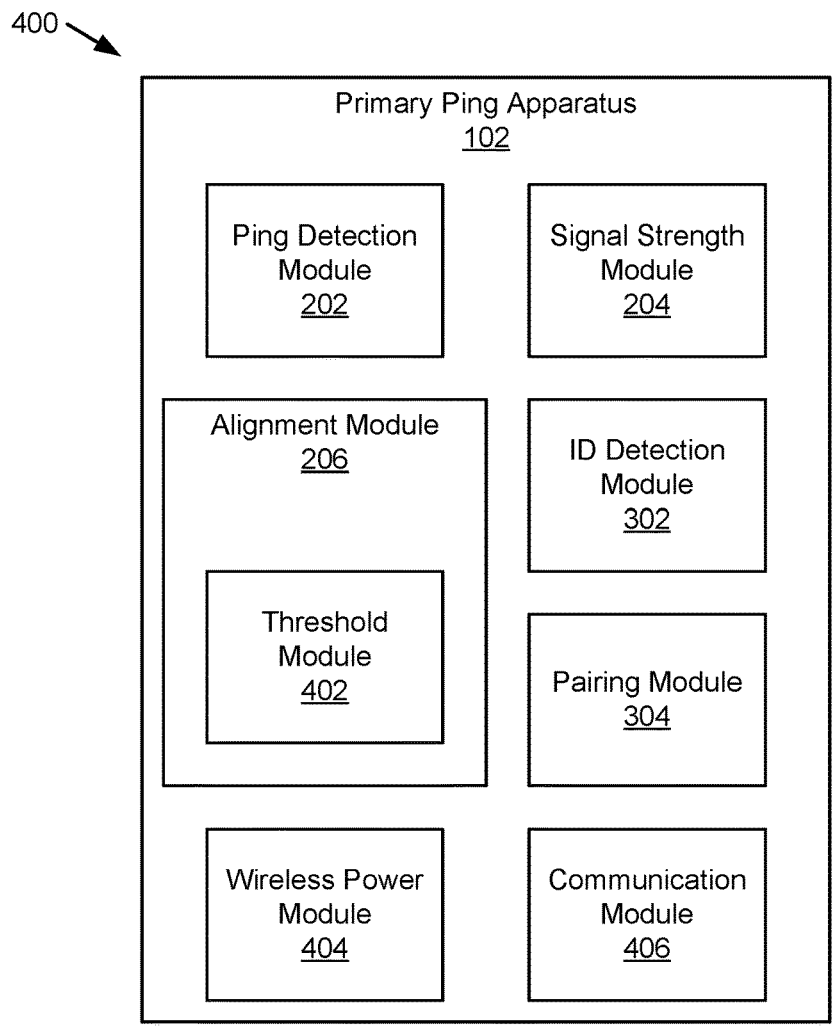
FIG. 4 is a schematic block diagram illustrating another embodiment of a primary ping apparatus in accordance with one embodiment of the present invention.

FIG. 4 is a schematic block diagram illustrating another embodiment of a primary ping apparatus 400 in accordance with one embodiment of the present invention. The apparatus 400, in one embodiment, includes a ping detection module 202, a signal strength module 204, and an alignment module 206, which are substantially similar to those described above in relation to the apparatus 200 of FIG. 2, and an ID detection module 302 and a pairing module 304 which are substantially similar to those described above in relation to the apparatus 300 of FIG. 3. The apparatus 400 may also include, in various embodiments, a threshold module 402 in the alignment module 206, and a wireless power module 404, which are described below.

The apparatus 400, in one embodiment, includes a threshold module 402 in the alignment module 206 that determines that the secondary pad 116 is aligned within the primary pad 108 within a specified alignment tolerance in response to the signal strength of the received ping signal being above a ping signal threshold. For example, the ping signal threshold may correlate to a minimum allowable degree of alignment and when the threshold module 402 determines that the signal strength of the ping signal is above the ping signal threshold, the alignment module 206 may determine that that the degree of alignment is above the specified alignment tolerance.

In another embodiment, the apparatus 400 may include a plurality of ping signal thresholds and the threshold module 402 determines a degree of alignment that the secondary pad 116 is aligned within the primary pad 108 in response to determining which of the plurality of ping signal thresholds is exceeded by the signal strength of the received ping signal. Using multiple thresholds may be used to guide alignment during a real time alignment procedure where alignment may be displayed visually or signaled audibly. For example, increasing beeping frequency may correspond to each ping signal threshold. One of skill in the art will recognize other ways to utilize multiple ping signal thresholds.

In one embodiment, the apparatus 400 includes a wireless power module 404 that initiates the wireless power transfer operation in response to the alignment module 206 determining that the amount of alignment of the secondary pad 116 with respect to the primary pad 108 meets a specified alignment tolerance. For example, meeting the desired amount of alignment may trigger the wireless power transfer operation.

In one embodiment, the pairing module 304 pairs the stationary WPT device 104 with the mobile device 114 in response to the ID detection module 302 detecting the mobile device ID of the mobile device 114 and the alignment module 206 determining that the signal strength of the received ping signal is above a ping signal threshold, which may signify that the amount of alignment of the secondary pad 116 with the primary pad 108 is within a specified alignment tolerance. Having pairing depend on both detecting the mobile device ID and having a ping signal strength above the ping signal threshold is useful to eliminate any crosstalk between adjacent stationary WPT devices 104 or other transmitted mobile device ID signals in other ping signals.

For example, if two or more stationary WPT devices 104 are positioned adjacent, such as at a central garage where vehicles are parked, multiple mobile devices 114 may be sending a ping signal, each with a mobile device ID. If conditions are present that a single stationary WPT device 104 detects multiple ping signals, a requirement that the signal strength of the ping signal is above a ping signal threshold may eliminate mobile devices 114 not aligned with the stationary WPT device.

The pairing and alignment conditions may also be used to enable the wireless power module 404 for wireless power charging. For example, requiring detection of a mobile device ID along with a certain signal strength of a ping signal helps to prevent power transfer to an unauthorized mobile device 114. For example, a worst case may include a mobile device 114 positioned halfway between two stationary WPT devices 104 positioned next to each other. The ping signal thresholds may be chosen to exclude determination that either stationary WPT device 104 is aligned with the mobile device 114. For example, the ping signal threshold may be set so that the secondary pad 116 of a mobile device 114 is mostly over the primary pad 108 of one stationary WPT device 104 or the other before being considered aligned enough for wireless power transfer.

In one embodiment, where the WPT system 100 includes multiple stationary WPT devices 104 and/or multiple mobile devices 114, the apparatus 400 includes a communication module 406 that communicates with at least the multiple stationary WPT devices 104 and alerts the multiple of stationary WPT devices 104 that the stationary WPT device 104 that received the ping signal is paired with the mobile device 114 that transmitted the ping signal.

In one embodiment, pairing of the stationary WPT device 104 with the mobile device 114 includes initiating communication, through the communication module 406, between the stationary WPT device 104 and the mobile device 114. For example, the stationary WPT device 104 and the mobile device 114 may communicate over a wireless communication network local to a location of the stationary WPT device 104. Pairing may include a handshaking operation to exchange date to establish a communication link between the stationary WPT device 104 and the mobile device 114. The communication link may be used as a control interface to share control signal information, may be used to communicate status information, such as a battery charging level, temperature, and other variables used in battery charging, and the like. One of skill in the art will recognize other information that may be exchanged after establishing a communication link between the stationary WPT device 104 and the mobile device 114 after pairing.

Figure 5:
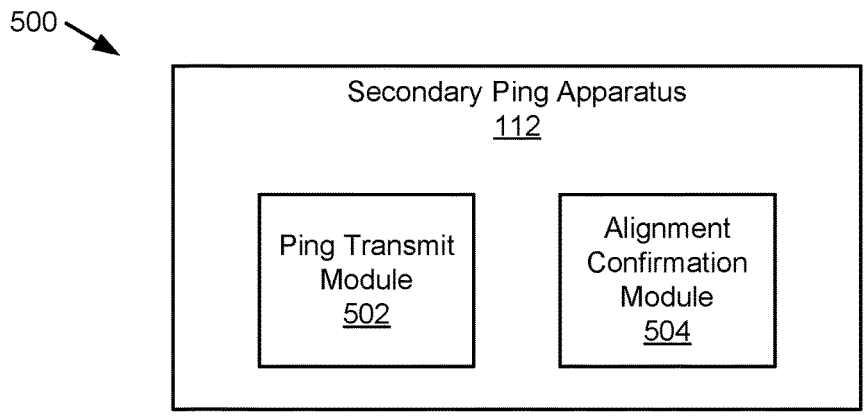
FIG. 5 is a schematic block diagram illustrating one embodiment of a secondary ping apparatus in accordance with one embodiment of the present invention.

FIG. 5 is a schematic block diagram illustrating one embodiment of a secondary ping apparatus 500 in accordance with one embodiment of the present invention. The apparatus 500, in one embodiment, includes a ping transmit module 502 and an alignment confirmation module 504, which are described below.

In one embodiment, the apparatus 500 include a ping transmit module 502 that transmits a ping signal from a secondary pad 116 to a primary pad 108. The secondary pad 116 is located on a mobile device 114 and the primary pad 108 located on a stationary WPT device 104. The stationary WPT device 104 transmits power through the primary pad 108 to the secondary pad 116 of the mobile device 114 during a wireless power transfer operation. The ping signal is described above and may include a mobile device ID. The ping transmit module 502, in various embodiments, may transmit the ping signal based on a command from a user, based on detection of a location, for example using a global positioning system ("GPS") coordinate, based on being in range of a wireless communication network, or other trigger known to those of skill in the art.

The apparatus 500 includes, in one embodiment, an alignment confirmation module 504 that receives an alignment confirmation that the secondary pad 116 is aligned within the primary pad 108 within a specified alignment tolerance. In one embodiment, the alignment confirmation is in response to determining, at the primary pad 108, a signal strength of the received ping signal and determining that an amount of alignment of the secondary pad 116 with respect to the primary pad 108 based on the determined signal strength of the received ping signal is within the specified alignment tolerance.

In one embodiment, the alignment confirmation includes the secondary pad 116 receiving power wirelessly from the primary pad 108 in a wireless power transfer operation. In another embodiment, the alignment confirmation module 504 receives the alignment confirmation as a message. The mobile device 114 may then use the alignment confirmation to initiate communication, to prepare for receiving power wirelessly or to alert a vehicle driver. One of skill in the art will recognize other uses of the alignment confirmation. In one embodiment, determining that an amount of alignment of the secondary pad 116 with respect to the primary pad 108 is within the specified alignment tolerance includes determining that the signal strength of the received ping signal being above a ping signal threshold.

Figure 6:
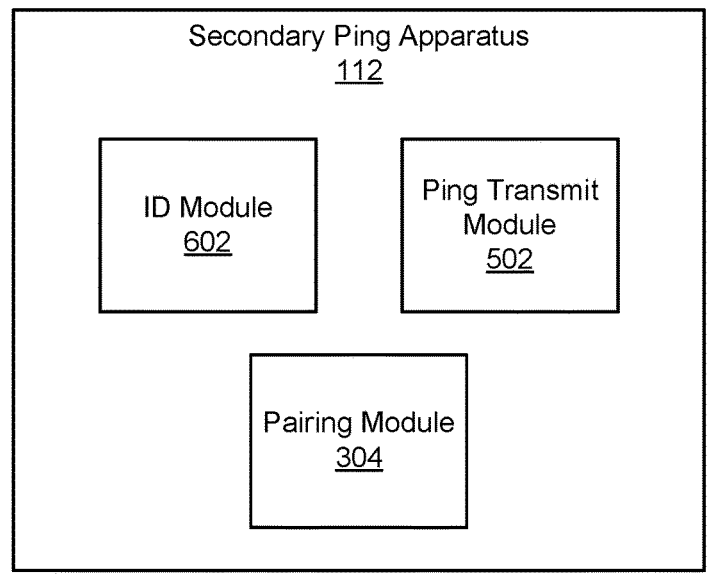
FIG. 6 is a schematic block diagram illustrating an alternate embodiment of a secondary ping apparatus in accordance with one embodiment of the present invention.

FIG. 6 is a schematic block diagram illustrating an alternate embodiment of a secondary ping apparatus 600 in accordance with one embodiment of the present invention. The apparatus 600, in one embodiment, includes a ping transmit module 502 substantially similar to the ping transmit module 502 described above in relation to the apparatus 500 of FIG. 5, and a pairing module 304 that may be substantially similar to the pairing module 304 described in relation to the apparatus 300 of FIG. 3. The apparatus 600 also includes an ID module 602, that that generates a mobile device ID where the mobile device ID is unique to a mobile device 114. The ping transmit module 502 transmits a ping signal from the secondary pad 116 to the primary pad 108 where the ping signal includes the mobile device ID. For example, the ID module 602 may generate a digital signal that corresponds to the mobile device ID in a form that may be combined with the ping signal. For example, when the ping signal is a sinusoidal frequency of a particular frequency, the ID module 602 may generate a mobile device ID signal at a higher frequency and may use the ping signal as a carrier. In another embodiment, the ID module 602 controls the ping transmit module 502 in such a way to turn the ping signal on and off at specified intervals to communicate the mobile device ID.

In one embodiment, the WPT system 100 includes multiple mobile devices 114 and/or multiple stationary WPT devices 104 and the pairing module 304 pairs the stationary WPT device 104 that received the ping signal with the mobile device 114 that transmitted the ping signal in response to the stationary WPT device 104 detecting the mobile device ID of the mobile device 114. For example, the stationary WPT device 104 may communicate with the mobile device 114 that the mobile device ID has been detected. The pairing module 304 may be located in the secondary ping apparatus 112 as shown or a portion or all may be included with the stationary WPT device 104 or in another location.

Figure 7:
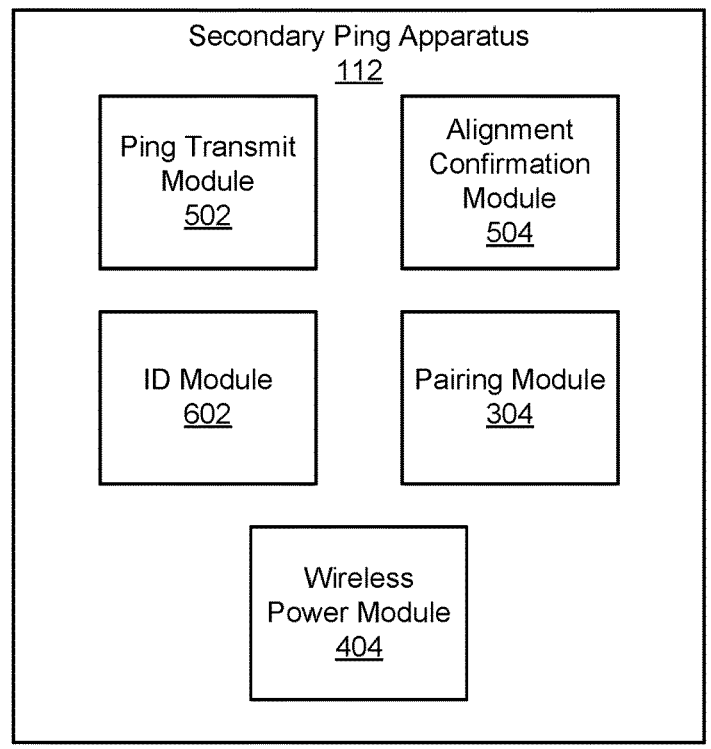
FIG. 7 is a schematic block diagram illustrating another embodiment of a secondary ping apparatus in accordance with one embodiment of the present invention.

FIG. 7 is a schematic block diagram illustrating another embodiment of a secondary ping apparatus 700 in accordance with one embodiment of the present invention. The apparatus 700, in one embodiment, includes a ping transmit module 502 and an alignment confirmation module 504 which are substantially similar to those described above in relation to the apparatus 500 of FIG. 5, and an ID module 602 that may be substantially similar to the ID module 602 described in relation the apparatus 600 of FIG. 6. The apparatus 700, in some embodiments, may also include a pairing module 304, and a wireless power module 404. The pairing module 304, in one embodiment, is substantially similar to the pairing module 304 described above in relation to the apparatus 300 of FIG. 3 and the wireless power module 404 may be similar to the wireless power module described in the apparatus 400 of FIG. 4.

All or a portion of the wireless power module 404 may be included in the secondary ping apparatus 112 or in another location. For example, the wireless power module 404 in the primary ping apparatus 102 may initiate wireless power transfer or the stationary WPT device 104 may cooperate with a wireless power module 404 in the secondary ping apparatus 112 to initiate the wireless power transfer. In one embodiment, the pairing module 304 pairs the stationary WPT device 104 with the mobile device 114 and/or the wireless power module initiates a power transfer operation in response to both the stationary WPT device 104 detecting the mobile device ID of the mobile device 114 and the stationary WPT device 104 determining that the signal strength of the received ping signal is above a ping signal threshold signifying that the amount of alignment of the secondary pad 116 with the primary pad 108 is within a specified alignment tolerance.

Figure 8:
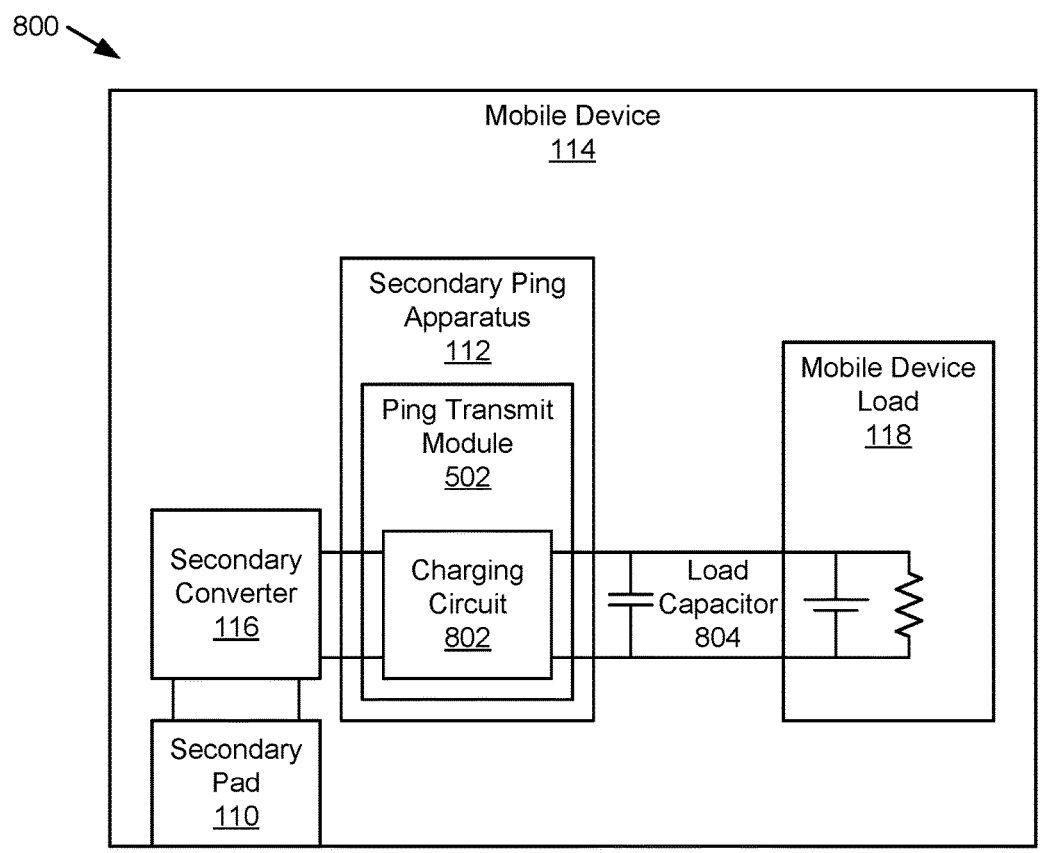
FIG. 8 is a schematic block diagram illustrating one embodiment of an apparatus with a mobile device with a secondary ping apparatus in accordance with one embodiment of the present invention.

FIG. 8 is a schematic block diagram illustrating one embodiment of an apparatus 800 with a mobile device 114 with a secondary ping apparatus 112 in accordance with one embodiment of the present invention. The apparatus 800, in one embodiment, includes a mobile device 114 with a secondary ping apparatus 112 that includes a ping transmit module 502 with a charging circuit 802, a secondary pad 116, a secondary converter 118, a mobile device load 120, and a load capacitor 804, which are described below. Note that while the secondary ping apparatus 112 in FIG. 8 is only depicted with a ping transmit module 502, in various embodiments, the secondary ping apparatus 112 may include an alignment confirmation module 504, an ID module 602, a pairing module 304, a wireless power module 404, and other devices and modules described above. The apparatus 800 depicts a charging circuit 802 for charging one or more load capacitors 804 while other modules are not depicted as a matter of convenience.

The apparatus 800, in one embodiment, includes a charging circuit 802 that utilizes at least a portion of the ping transmit module 502 to charge and/or discharge a load capacitor 804 in the mobile device 114 prior to a wireless power transfer operation where power is transferred from the primary pad 108 to the secondary pad 116. For example, the load capacitor 804 may be discharged initially. In one embodiment, the mobile device load 120 includes an energy storage device, such as a battery. Connection of the energy storage device to the load capacitor 804 while the load capacitor 804 is discharged may draw a current that may damage components in the mobile device 114. In addition, wireless power transfer to the mobile device 114 with a load capacitor 804 that is discharged may generate currents that are higher than desired. The charging circuit 802, in one embodiment, charges the load capacitor 804 prior to wireless power transfer. In another embodiment, the charging circuit 802 discharges the load capacitor 804, for example for safety.

In one embodiment, a power source in the mobile device 114, such as the energy storage device, may connect to the charging circuit 802 and may be used to charge the load capacitor 804. The charging circuit 802 may also use the mobile device load 120 to discharge the load capacitor 804. While the term "load capacitor 804" is used herein, the load capacitor 804 may include one capacitor or multiple capacitors. In addition, reference to single capacitor, as used herein, may include one or more capacitors. The load capacitor 804 may also include a resistor, an inductor, or other components for snubbing, current limiting, etc. One of skill in the art will recognize other configurations of a load capacitor 804.

Figure 9:
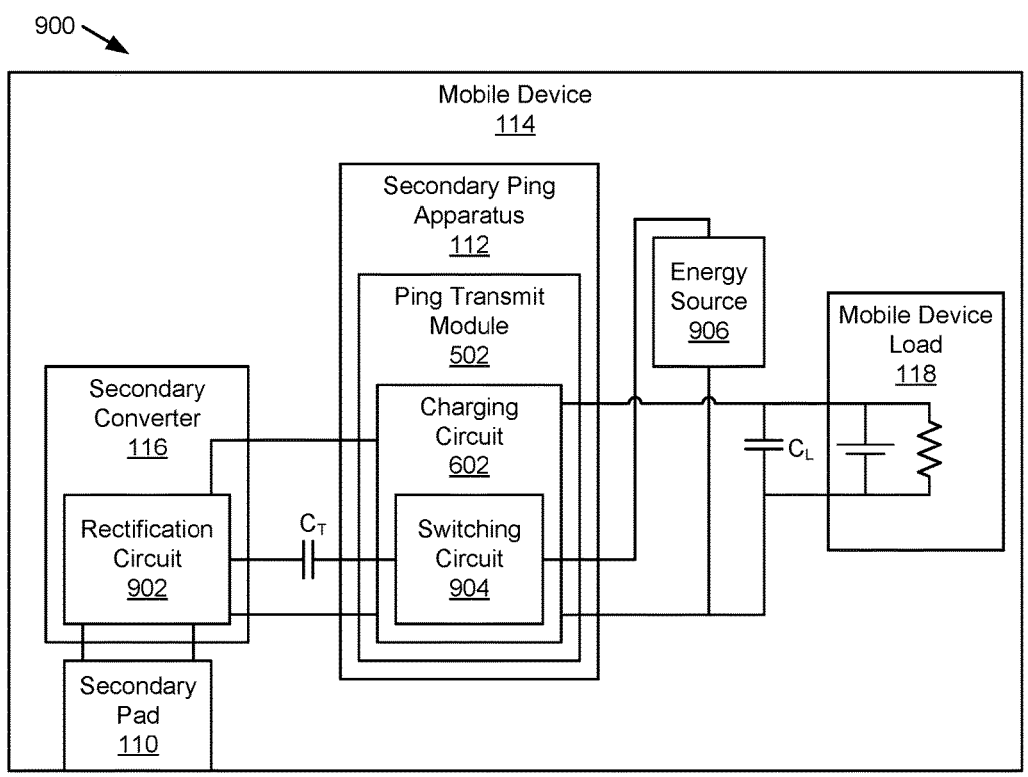
FIG. 9 is a schematic block diagram illustrating another embodiment of an apparatus with a mobile device with a secondary ping apparatus in accordance with one embodiment of the present invention.

FIG. 9 is a schematic block diagram illustrating another embodiment of an apparatus 900 with a mobile device 114 with a secondary ping apparatus 112 in accordance with one embodiment of the present invention. The apparatus 900 is similar to the apparatus 800 of FIG. 8, but may include additional components and detail. The apparatus 900 includes a mobile device 114 with a secondary ping apparatus 112 that includes a ping transmit module 502 with a charging circuit 802, a secondary pad 116, a secondary converter 118, a mobile device load 120, and a load capacitor 804, which may be substantially similar to those described above in relation to the apparatus 800 of FIG. 8. In various embodiments, the apparatus 900 may include a secondary converter 118 with a rectification circuit 902, a charging circuit 802 with a switching circuit 904, an energy source 906, and a transfer capacitor $C_T$. In FIG. 7, the load capacitor 804 is labeled $C_L$.

In one embodiment, the rectification circuit 902 rectifies power transferred to the secondary pad 116 and transmits the rectified power to the load capacitor $C_L$ and to a mobile device load 120 of the mobile device 114, where the load capacitor $C_L$ and the mobile device load 120 are connected in parallel. In some embodiments, the load capacitor $C_L$ is connected in parallel with the mobile device load 120 for various reasons. For example, the load capacitor $C_L$ may be part of a low pass filter to filter out AC components of rectified AC waveforms received by the secondary pad 116 or from an additional DC-to-DC converter that may be present in the secondary converter 118. The load capacitor $C_L$ may also serve to stabilize voltage at the mobile device load 120. Often the load capacitor $C_L$ is substantial so that large inrush currents may damage other components.

The rectification circuit 902 may include a full bridge rectifier, a half bridge rectifier, or other rectification circuit and, as described above, may also include a DC-to-DC converter or an inverter to change voltage to the mobile device load 120 or to provide a specific AC power type to the mobile device load 120. Where the rectification circuit 902 includes a full bridge rectifier, the output will include a substantial DC component along with an AC waveform and harmonics. The load capacitor $C_L$ may contribute to filtering out the AC waveform and harmonics.

In the embodiment, the charging circuit 802 includes a switching circuit 904 connected between an energy source 906 of the mobile device 114 and the rectification circuit 902 through a transfer capacitor $C_T$. The switching circuit 904 includes a plurality of switching devices arranged to operate in a switching operation to alternately charge the transfer capacitor $C_T$ and to deliver energy stored in the charged transfer capacitor $C_T$ to the rectification circuit 902. The rectification circuit 902 then delivers the energy to the load capacitor $C_L$. In one embodiment, the transfer capacitor $C_T$ is significantly smaller than the load capacitor $C_L$ so that the transfer capacitor $C_T$ is charged and then discharged into the load capacitor $C_L$ many times before the load capacitor $C_L$ is charged. The switching circuit 904 may include a charge pump, a switching converter, or other switching configuration and associated components capable of delivering charge to the transfer capacitor $C_T$ and then causing the transfer capacitor $C_T$ to discharge to the load capacitor $C_L$.

In one embodiment, the energy source 906 is separate from the mobile device load 120, as depicted. In another embodiment, the energy source 906 is part of the mobile device load 120, for example, the energy source 906 may include the energy storage device of the mobile device load 120. In the embodiment, the mobile device 114 and/or charging circuit 802 may include switches to connect the energy storage device to the switching circuit 904 when charging the load capacitor. $C_L$.

Figure 10:
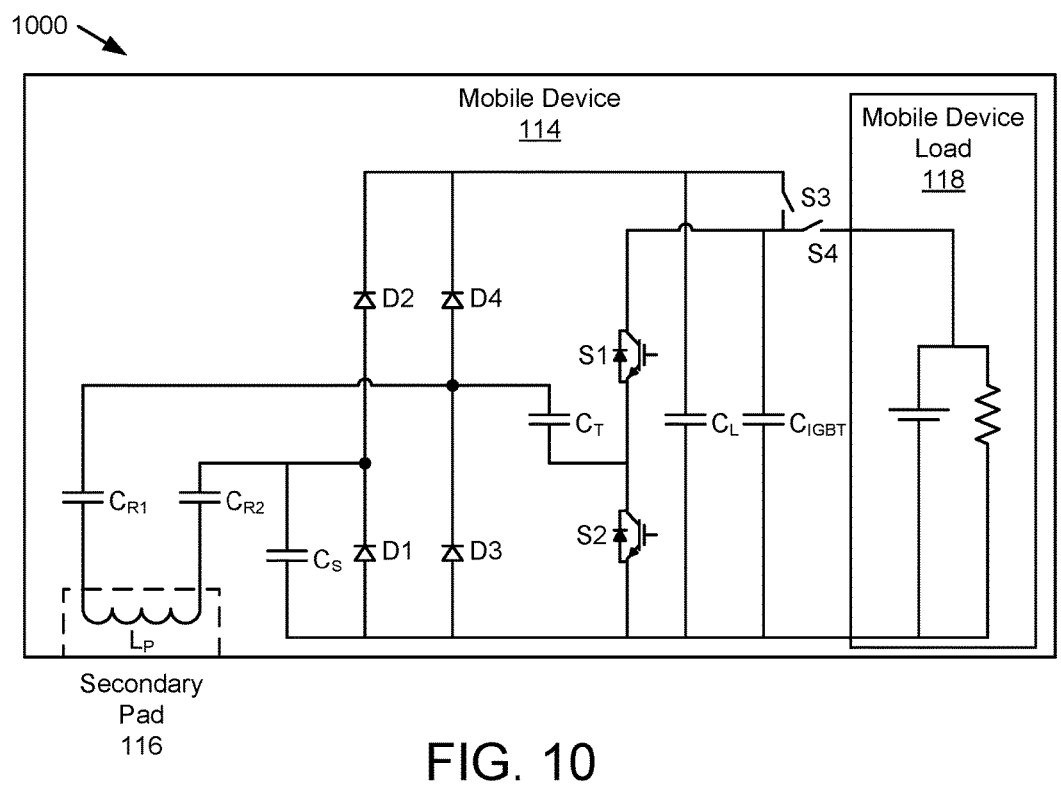
FIG. 10 is a schematic circuit diagram illustrating one embodiment of an apparatus with a mobile device with a secondary ping apparatus in accordance with one embodiment of the present invention.

FIG. 10 is a schematic circuit diagram illustrating one embodiment of an apparatus 1000 with a mobile device 114 with a secondary ping apparatus 112 in accordance with one embodiment of the present invention. The apparatus 1000, in one embodiment, is a particular embodiment of the apparatus 900 of FIG. 9. The rectification circuit 902, the secondary converter 118, the secondary ping apparatus 112, the ping transmit module 502, and the switching circuit 904 are not shown for clarity, but one of skill in the art will recognize they are included in the apparatus 1000. In the embodiment, the secondary pad 116 includes an inductor $L_P$, which may represent a portion of the inductance of the secondary pad 116. Resonant capacitors $C_{R1}$ and $C_{R2}$ may be considered part of the secondary converter 118 and typically contribute to the resonance of the secondary converter 118 in conjunction with the inductance $L_P$ of the secondary pad 116. Rectifier diodes D1, D2, D3 and D4 form part of one embodiment of the rectification circuit 902 and are configured as a full bridge rectifier. First and second switches S1 and S2, each depicted as an insulated gate bi-polar transistor ("IGBT"), form part of the switching circuit 904, along with a capacitor $C_{IGBT}$. Other components, such as drive circuits, etc. are not shown for clarity.

The switching circuit 904 may also include third and fourth switches S3 and S4, which may be contactors or other switching devices sized to carry load current to the mobile device load 120. The switching circuit 904, in one embodiment, is part of the charging circuit 802, which is also part of the ping transmit module 502 because the switching circuit 904 may have a dual purpose of generating a ping signal and charging or discharging the load capacitor $C_L$. In the embodiment, the energy storage device of the mobile device load 120 is used as the energy source 906 by using the third and fourth switches S3 and S4 in various combinations. Snubber capacitor $C_S$ is connected between ground and a leg of the rectification circuit 902 not connected to the transfer capacitor $C_T$. During wireless power transfer, the first switch S1 is in an open position and the second switch S2 is in a closed position and the transfer capacitor $C_T$ and the snubber capacitor $C_S$ form at least a portion of snubber circuits. The transfer capacitor $C_T$ and the snubber capacitor $C_S$ also combine with resonant capacitors $C_{R1}$ and $C_{R2}$ to change a resonant frequency of the mobile device 114 and the ping transmit module 502 generates a ping signal at a different frequency than the fundamental frequency of the wireless power transfer.

In a charge operation, the third switch S3 is open and the fourth switch S4 is closed to connect the switching circuit 904 to the energy source of the mobile device load 120 and to disconnect the load capacitor $C_L$ from the mobile device load 120. The first and second switches S1, S2 typically operate so that each switch is open during different half cycles of the capacitor charging operation. The first and second switches S1, S2 may have a fixed duty cycle or a variable duty cycle and operate together as a charge pump to alternately charge the transfer capacitor $C_T$ using the energy storage device of the mobile device load 120 and to transfer energy stored in the transfer capacitor $C_T$ to the load capacitor $C_L$. The duty cycle typically varies the on time of each of the first and second switches S1, S2 during each half cycle, so if the first switch S1 is on during 80% of the first half cycle, the second switch S2 is off and then during the second half cycle the second switch S2 may be on 80% of the second half cycle while the first switch S1 is off. In one embodiment, the charging circuit 802 controls the duty cycle based on a charge level of the load capacitor $C_L$. During a capacitor discharge operation, the fourth switch S4 is open while the third switch S3 is closed and the switching circuit 904 switches to dissipate energy from the load capacitor $C_L$. using switching losses of the first and second switches S1, S2. Addition of a resistor may dissipate the energy of the load capacitor $C_L$ faster than relying on the parasitic losses of the first and second switches S1, S2.

The ping transmit module 502 operates when the fourth switch S4 is closed and the third switch S3 is open to disconnect the rectification circuit 902 from the mobile device load 120. The first and second switches S1, S2 switch at a selected ping signal frequency and generate a ping signal that is transmitted through the secondary pad 116 to the primary pad 108, when present. In one embodiment, change of duty cycle of the first and second switches S1, S2 during generation of the ping signal varies the amplitude of the ping signal. The ID module 602 may connect to the switching circuit 904 to inject a mobile device ID into the ping signal, or may control timing of switching of the ping signal to have periods of ping signal transmission and periods of no ping signal in a particular sequence to encode the mobile device ID in the ping signal.

Figure 11:
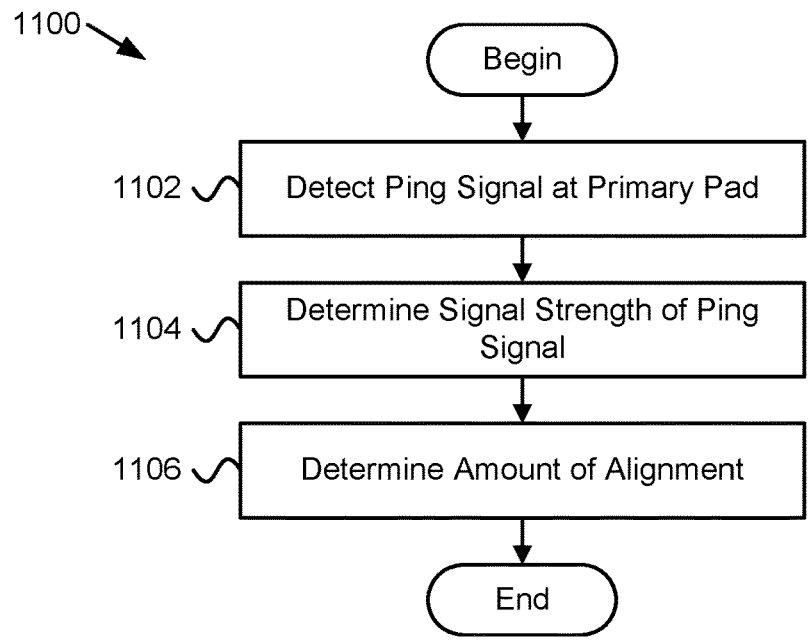
FIG. 11 is a schematic flowchart diagram illustrating one embodiment of a method for detecting a ping signal from a mobile device at a stationary WPT device and determining alignment in accordance with one embodiment of the present invention.

FIG. 11 is a schematic flowchart diagram illustrating one embodiment of a method 1100 for detecting a ping signal from a mobile device 114 at a stationary WPT device 104 and determining alignment in accordance with one embodiment of the present invention. The method 1100 begins and detects 1102 a ping signal transmitted from the secondary pad 116 to the primary pad 108 where the secondary pad 116 is located on the mobile device 114 and the primary pad 108 is located on a stationary WPT device 104. The stationary WPT device 104 transmits power through the primary pad 108 to the secondary pad 116 of the mobile device 114 during a wireless power transfer operation. In one embodiment, the ping detection module 202 detects 1102 the ping signal.

The method 1100 determines 1104 a signal strength of the ping signal received at the primary pad 108 and determines 1106 an amount of alignment of the secondary pad 116 with respect to the primary pad 108 based on the determined signal strength of the received ping signal, and the method 1100 ends. In various embodiments, the signal strength module 204 determines 1104 the signal strength of the ping signal and the alignment module 206 determines 1106 an amount of alignment.

Figure 12:
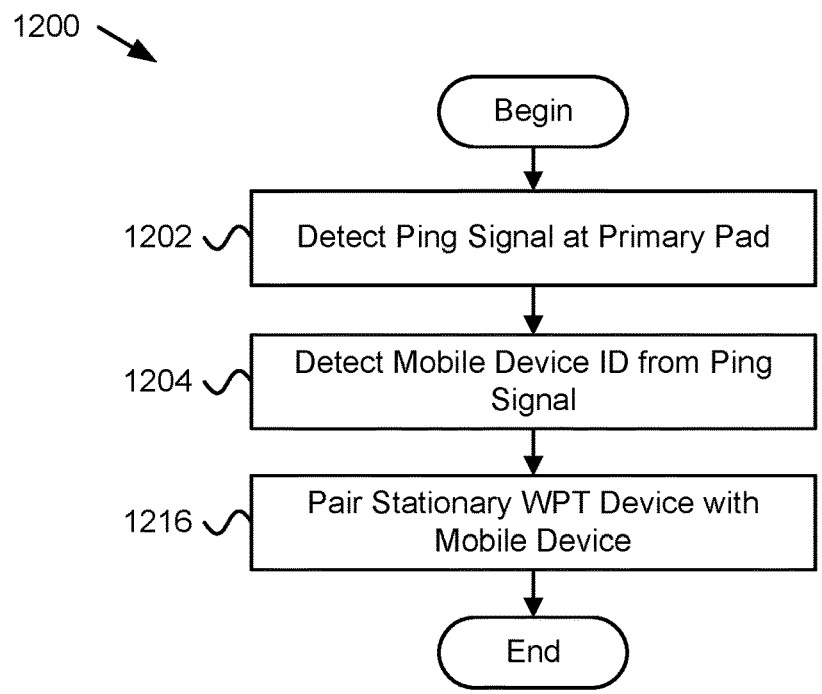
FIG. 12 is a schematic flowchart diagram illustrating one embodiment of a method for detecting a ping signal from a mobile device with a mobile device ID at a stationary WPT device and pairing the mobile device with the stationary WPT device in accordance with one embodiment of the present invention.

FIG. 12 is a schematic flowchart diagram illustrating one embodiment of a method 1200 for detecting a ping signal from a mobile device 114 with a mobile device ID at a stationary WPT device 104 and pairing the mobile device 114 with the stationary WPT device 104 in accordance with one embodiment of the present invention. The method 1200 begins and detects 1202 a ping signal transmitted from the secondary pad 116 to the primary pad 108 where the secondary pad 116 is located on the mobile device 114 and the primary pad 108 is located on a stationary WPT device 104. In one embodiment, the ping detection module 202 detects 1202 the ping signal.

The method 1200 detects 1204 the mobile device ID from the ping signal received at the primary pad 108 and pairs 1206 the stationary WPT device 104 with the mobile device 114 in response to detecting the mobile device ID of the mobile device 114, and the method 1200 ends. In some embodiments, the ID detection module 302 detects 1204 the mobile device ID and the pairing module 304 pairs 1206 the stationary WPT device 104 with the mobile device 114.

Figure 13:
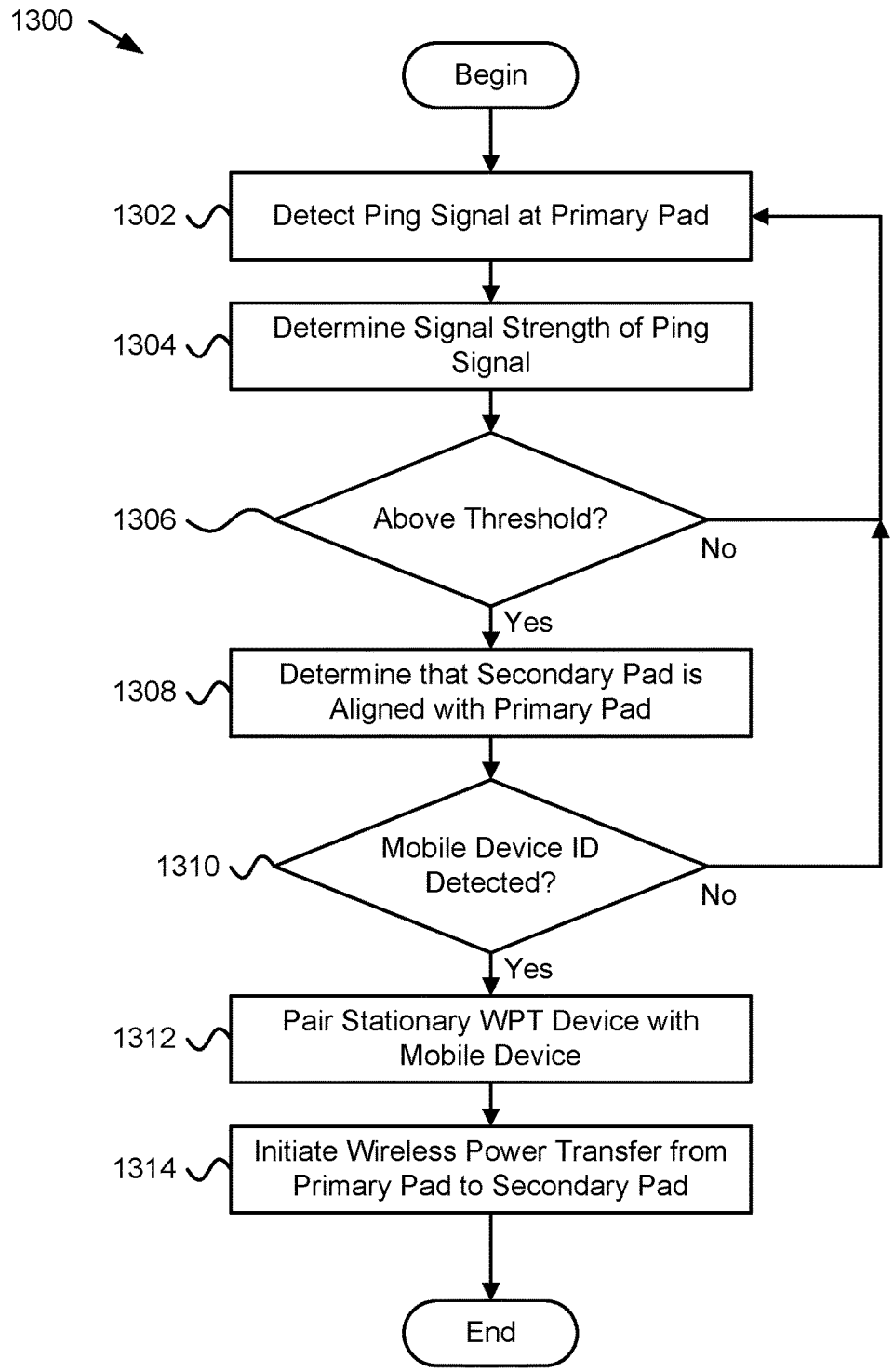
FIG. 13 is a schematic flowchart diagram illustrating one embodiment of a method for detecting a ping signal at a stationary WPT device and determining alignment as well as detecting a mobile device ID and pairing the stationary WPT device with the mobile device for wireless power transfer in accordance with one embodiment of the present invention.

FIG. 13 is a schematic flowchart diagram illustrating one embodiment of a method 1300 for detecting a ping signal at a stationary WPT device 104 and determining alignment as well as detecting a mobile device ID and pairing the stationary WPT device 104 with the mobile device 114 for wireless power transfer in accordance with one embodiment of the present invention. The method 1300 begins and detects 1302 a ping signal transmitted from a secondary pad 116 to a primary pad 108 and determines 1304 a signal strength of the ping signal received at the primary pad 108. The method 1300 determines 1306 if the signal strength of the ping signal is above a ping signal threshold. If the method 1300 determines 1306 that the signal strength of the ping signal is not above a ping signal threshold, the method 1300 returns and detects 1302 a ping signal. If the method 1300 determines 1306 that the signal strength of the ping signal is above a ping signal threshold, the method 1300 determines 1308 that the secondary pad 116 is aligned with the primary pad 108. In one embodiment, the threshold module 402 determines 1306 if the signal strength of the ping signal is above the ping signal threshold.

The method 1300 determines 1310 if a mobile device ID from the ping signal is received at the primary pad 108. If the method 1300 determines 1310 that a mobile device ID from the ping signal is not received at the primary pad 108, the method 1300 returns and detects 1302 a ping signal at the primary pad 108. If the method 1300 determines 1310 that a mobile device ID from the ping signal is received at the primary pad 108, the method 1300 pairs 1312 the stationary WPT device 104 with the mobile device 114 and initiates 1314 wireless power transfer from the primary pad 108 to the secondary pad 116, and the method 1300 ends. In some embodiments, the ID detection module 302 determines 1310 a mobile device ID from the ping signal, the pairing module 304 pairs 1312 the stationary WPT device 104 with the mobile device 114, and/or the wireless power module 404 initiates 1314 wireless power transfer from the primary pad 108 to the secondary pad 116.

Figure 14:
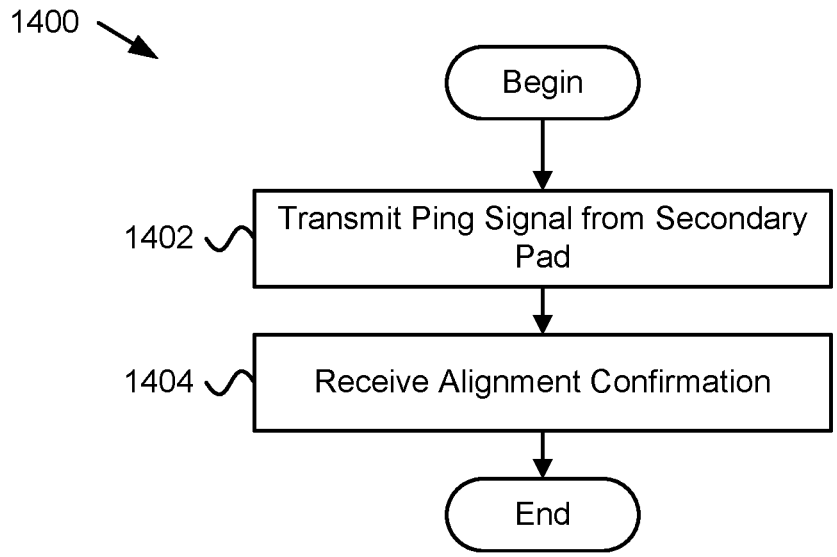
FIG. 14 is a schematic flowchart diagram illustrating one embodiment of a method for transmitting a ping signal from a mobile device and receiving an alignment confirmation in accordance with one embodiment of the present invention.

FIG. 14 is a schematic flowchart diagram illustrating one embodiment of a method 1400 for transmitting a ping signal from a mobile device 114 and receiving an alignment confirmation in accordance with one embodiment of the present invention. The method 1400 begins and transmits 1402 a ping signal from the secondary pad 116 to a primary pad 108. The secondary pad 116 is located on a mobile device 114 and the primary pad 108 is located on the stationary WPT device 104. The stationary WPT device 104 transmits power through the primary pad 108 to the secondary pad 116 of the mobile device 114 during a wireless power transfer operation. In one embodiment, the ping transmit module 502 transmits the ping signal.

The method 1400 receives 1404 an alignment confirmation that the secondary pad 116 is aligned within the primary pad 108 within a specified alignment tolerance, and the method 1400 ends. The alignment confirmation is generated and sent in response to determining, at the primary pad 108, a signal strength of the received ping signal, and determining that an amount of alignment of the secondary pad 116 with respect to the primary pad 108 based on the determined signal strength of the received ping signal is within the specified alignment tolerance. In one embodiment, the alignment confirmation module 504 receives 1404 the alignment confirmation.

Figure 15:
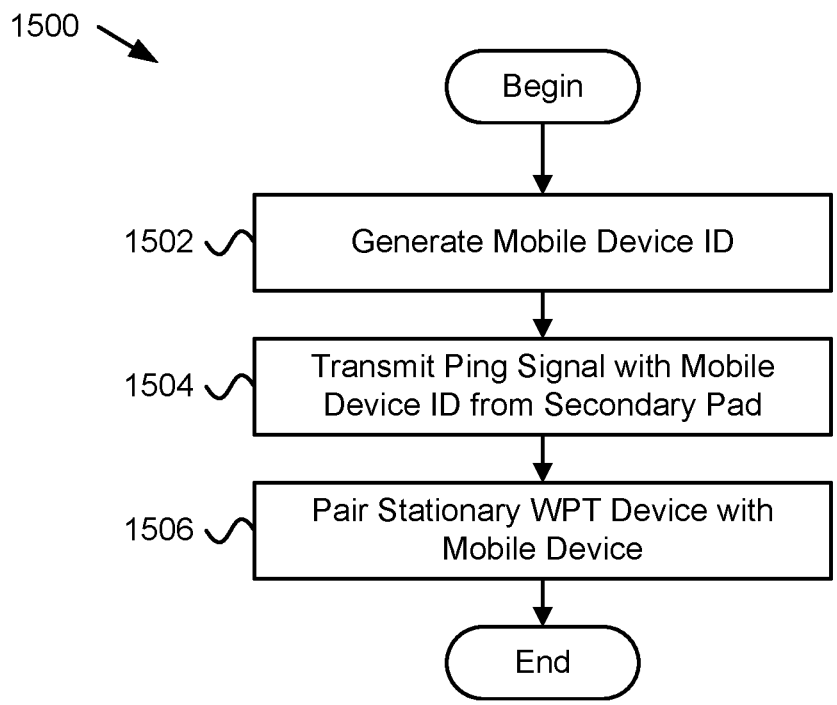
FIG. 15 is a schematic flowchart diagram illustrating one embodiment of a method for transmitting a ping signal with a mobile device ID from a mobile device and pairing a stationary WPT device with the mobile device in accordance with one embodiment of the present invention.

FIG. 15 is a schematic flowchart diagram illustrating one embodiment of a method 1500 for transmitting a ping signal with a mobile device ID from a mobile device 114 and pairing a stationary WPT device 104 with the mobile device 114 in accordance with one embodiment of the present invention. The method 1500 begins and generates 1502 a mobile device ID, where the mobile device ID is unique to a mobile device 114. In one embodiment, the ID module 602 generates 1502 the mobile device ID. The method 1500 transmits 1504 a ping signal with the mobile device ID from the secondary pad 116. The secondary pad 116 is located on the mobile device 114 and the primary pad 108 located on the stationary WPT device 104. The stationary WPT device 104 transmits power through the primary pad 108 to the secondary pad 116 of the mobile device 114 during a wireless power transfer operation. In one embodiment, the ping transmit module 502 transmits the ping signal. The method 1500 pairs 1506 the stationary WPT device 104 with the mobile device 114 in response to detecting the mobile device ID of the mobile device 114, and the method 1500 ends. In one embodiment, the pairing module 304 pairs 1506 the stationary WPT device 104 with the mobile device 114.

Figure 16:
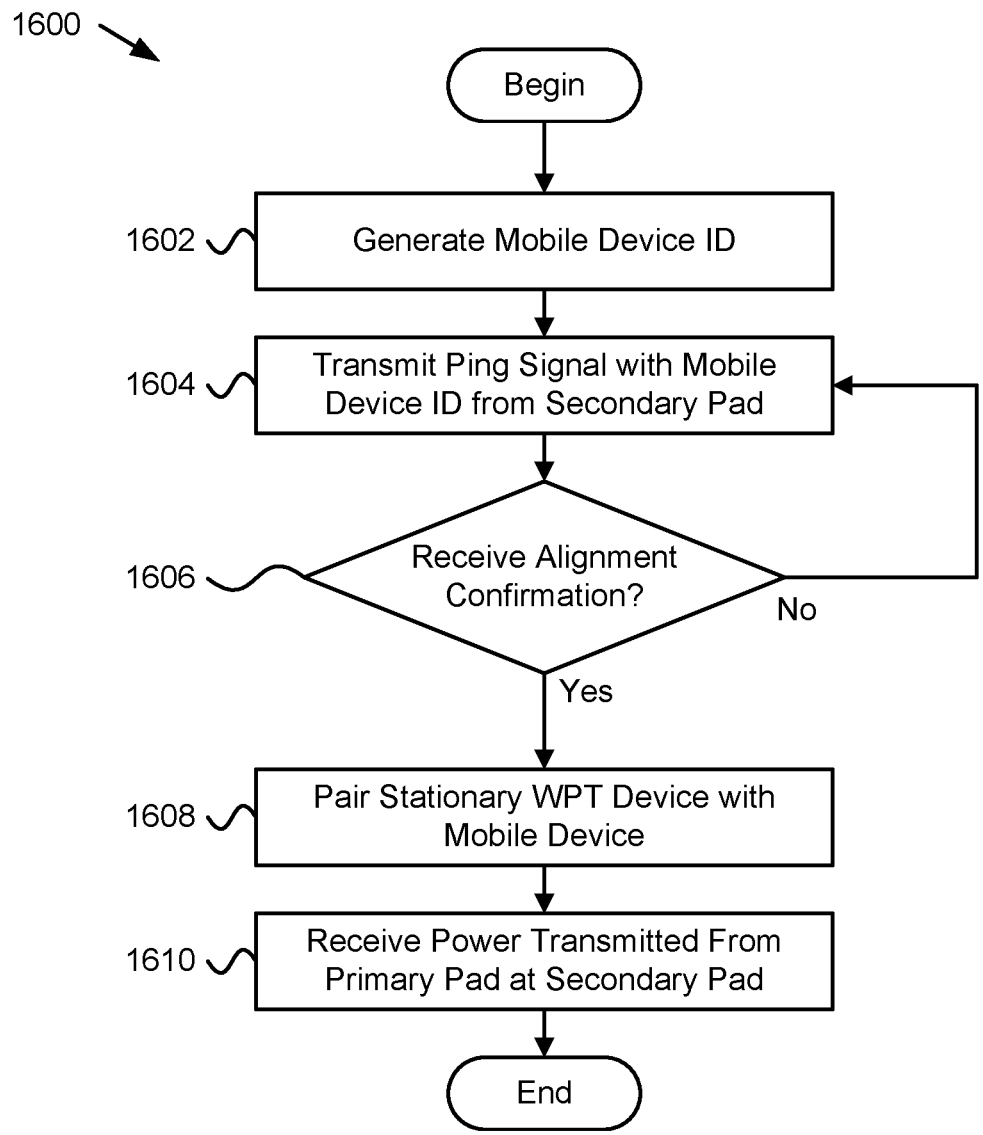
FIG. 16 is a schematic flowchart diagram illustrating one embodiment of a method for transmitting a ping signal with a mobile device ID from a mobile device and pairing a stationary WPT device with the mobile device and receiving power from the stationary WPT device in accordance with one embodiment of the present invention.

FIG. 16 is a schematic flowchart diagram illustrating one embodiment of a method 1600 for transmitting a ping signal with a mobile device ID from a mobile device 114 and pairing a stationary WPT device 104 with the mobile device 114 and receiving power from the stationary WPT device 104 in accordance with one embodiment of the present invention. The method 1600 begins and generates 1602 a mobile device ID unique to the mobile device 114 and transmits 1604 a ping signal with the mobile device ID from the secondary pad 116. In one embodiment, the ID module 602 generates 1502 the mobile device ID and the ping transmit module 502 transmits the ping signal.

The method 1600 determines 1606 if an alignment confirmation is received. If the method 1600 determines 1606 that an alignment confirmation is not received, the method 1600 returns and transmits 1604 a ping signal with the mobile device ID. If the method 1600 determines 1606 that an alignment confirmation is received, the method 1600 pairs 1608 the stationary WPT device 104 with the mobile device 114 and receives 1610 at the secondary pad 116 power transmitted from the primary pad 108, and the method 1600 ends. In one embodiment, the method 1600 initiates the power transfer. In some embodiments, the alignment confirmation module 504 determines if the alignment confirmation is received, the pairing module 304 pairs the stationary WPT device 104 with the mobile device 114, and/or the wireless power module 404 initiates wireless power transfer.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

COMPONENT LIST

100 WPT system
102 primary ping apparatus
104 stationary WPT device
106 primary inverter
108 primary pad
110 power source
112 secondary ping apparatus
114 mobile device 116 secondary pad
118 secondary converter
120 mobile device load
122 communications network
124 control center
202 ping detection module
204 signal strength module
206 alignment module
302 ID detection module
304 pairing module
402 threshold module
404 wireless power module
406 communication module
502 ping transmit module
504 alignment confirmation module
602 ID module
802 charging circuit
804 load capacitor
902 rectification circuit
904 switching circuit
906 energy source
$L_P$ secondary pad inductor
$C_{R1}$ resonant capacitor
$C_{R2}$ resonant capacitor
$C_S$ snubber capacitor
$C_T$ transfer capacitor
$C_L$ load capacitor (also 804)
$C_{IGBT}$ capacitor
D1 rectifier diode
D2 rectifier diode
D3 rectifier diode
D4 rectifier diode
S1 first switch
S2 second switch
S3 third switch
S4 fourth switch

What is claimed is:

1. An apparatus comprising:
a ping detection circuit that detects a ping signal transmitted from a secondary pad to a primary pad, the secondary pad located on a mobile device, the primary pad located on a stationary wireless power transfer ("WPT") device, the stationary WPT device transmitting power through the primary pad to the secondary pad of the mobile device during a wireless power transfer operation, the ping signal comprising a mobile device identifier ("ID"), the mobile device ID being unique to the mobile device;
an ID detection circuit that detects the mobile device ID from the ping signal received at the primary pad;
a pairing circuit that pairs the stationary WPT device with the mobile device in response to detecting the mobile device ID of the mobile device;
a signal strength circuit that determines a signal strength of the received ID embedded ping signal; and
an alignment circuit that determines an amount of alignment of the secondary pad with respect to the primary pad based on the determined signal strength of the received ID embedded ping signal.

2. The apparatus of claim 1, wherein one or more of:
the mobile device comprises one of a plurality of mobile devices; and
the stationary WPT device comprises one of a plurality of stationary WPT devices.

3. The apparatus of claim 2, further comprising a communication circuit that communicates with at least the plurality of stationary WPT devices and alerts the plurality of stationary WPT devices that the stationary WPT device that received the ping signal is paired with the mobile device that transmitted the ping signal.

4. The apparatus of claim 1, wherein one or more of:
the pairing circuit pairs the stationary WPT device with the mobile device; and
a wireless power circuit initiates the wireless power transfer operation;
in response to:
the ID detection circuit detecting the mobile device ID of the mobile device; and
the alignment circuit determining that the signal strength of the received ID embedded ping signal is above a ping signal threshold signifying that the amount of alignment of the secondary pad with the primary pad is within a specified alignment tolerance.

5. An apparatus comprising:
an ID circuit that generates a mobile device identifier ("ID"), the mobile device ID being unique to a mobile device;
a ping transmit circuit that transmits a ping signal from a secondary pad to a primary pad, the secondary pad located on the mobile device, the primary pad located on a stationary wireless power transfer ("WPT") device, the stationary WPT device transmitting power through the primary pad to the secondary pad of the mobile device during a wireless power transfer operation, the ping signal comprising the mobile device ID;
a pairing circuit that pairs the stationary WPT device receiving the ping signal with the mobile device transmitting the ping signal in response to the stationary WPT device detecting the mobile device ID of the mobile device, wherein one or more of:
the mobile device comprises one of a plurality of mobile devices; and
the stationary WPT device comprises one of a plurality of stationary WPT devices; and an alignment confirmation circuit that receives an alignment confirmation that the secondary pad is aligned within the primary pad within a specified alignment tolerance, the alignment confirmation in response to determining, at the primary pad, a signal strength of the received ID embedded ping signal, and determining that an amount of alignment of the secondary pad with respect to the primary pad based on the determined signal strength of the received ID embedded ping signal is within the specified alignment tolerance.

6. The apparatus of claim 5, wherein one or more of:
the pairing circuit pairs the stationary WPT device with the mobile device; and
a wireless power circuit initiates the wireless power transfer operation;
in response to:
the stationary WPT device detecting the mobile device ID of the mobile device; and
the stationary WPT device determining that the signal strength of the received ID embedded ping signal is above a ping signal threshold signifying that the amount of alignment of the secondary pad with the primary pad is within the specified alignment tolerance.

7. A method comprising:
detecting a ping signal transmitted from a secondary pad to a primary pad, the secondary pad located on a mobile device, the primary pad located on a stationary wireless power transfer ("WPT") device, the stationary WPT device transmitting power through the primary pad to the secondary pad of the mobile device during a wireless power transfer operation, the ping signal comprising a mobile device identifier ("ID"), the mobile device ID being unique to the mobile device;

detecting the mobile device ID from the ping signal received at the primary pad;

pairing the stationary WPT device with the mobile device in response to detecting the mobile device ID of the mobile device;

determining a signal strength of the received ID embedded ping signal; and determining an amount of alignment of the secondary pad with respect to the primary pad based on the determined signal strength of the received ID embedded ping signal.

8. The method of claim 7, wherein one or more of:
the mobile device comprises one of a plurality of mobile devices; and
the stationary WPT device comprises one of a plurality of stationary WPT devices; and
further comprising communicating with at least the plurality of stationary WPT devices and alerting the plurality of stationary WPT devices that the stationary WPT device that received the ping signal is paired with the mobile device that transmitted the ping signal.

9. The method of claim 7, wherein one or more of:
pairing the stationary WPT device with the mobile device; and
initiating the wireless power transfer operation;
occur in response to:
  detecting the mobile device ID of the mobile device; and
  determining that the signal strength of the received ID embedded ping signal is above a ping signal threshold signifying that the amount of alignment of the secondary pad with the primary pad is within a specified alignment tolerance.

10. A method comprising:
generating a mobile device identifier ("ID"), the mobile device ID being unique to a mobile device;

transmitting a ping signal from a secondary pad to a primary pad, the secondary pad located on the mobile device, the primary pad located on a stationary wireless power transfer ("WPT") device, the stationary WPT device transmitting power through the primary pad to the secondary pad of the mobile device during a wireless power transfer operation, the ping signal comprising the mobile device ID;

pairing the stationary WPT device with the mobile device in response to the stationary WPT device detecting the mobile device ID of the mobile device, wherein one or more of:
  the mobile device comprises one of a plurality of mobile devices; and
  the stationary WPT device comprises one of a plurality of stationary WPT devices; and receiving an alignment confirmation that the secondary pad is aligned within the primary pad within a specified alignment tolerance, the alignment confirmation in response to determining, at the primary pad, a signal strength of the received ID embedded ping signal, and determining that an amount of alignment of the secondary pad with respect to the primary pad based on the determined signal strength of the received ID embedded ping signal is within the specified alignment tolerance.

11. The method of claim 10, wherein one or more of:
pairing the stationary WPT device with the mobile device; and
initiating the wireless power transfer operation of the power from the primary pad to the secondary pad;
occur in response to:
  detecting the mobile device ID of the mobile device; and
  determining that the signal strength of the received ID embedded ping signal is above a ping signal threshold signifying that the amount of alignment of the secondary pad with the primary pad is within the specified alignment tolerance.

* * * * *